US012731373B2

(12) United States Patent
Wajjala

(10) Patent No.: US 12,731,373 B2
(45) Date of Patent: Sep. 8, 2026

(54) CLASSIFICATION OF THREE-DIMENSIONAL (3D) OBJECTS IN A VIRTUAL ENVIRONMENT

(71) Applicant: Roblox Corporation, San Mateo, CA (US)

(72) Inventor: Phani Harish Wajjala, San Mateo, CA (US)

(73) Assignee: Roblox Corporation, San Mateo, CA (US)

( * ) Notice: Subject to any disclaimer, the term of this patent is extended or adjusted under 35 U.S.C. 154(b) by 228 days.

(21) Appl. No.: 18/231,474

(22) Filed: Aug. 8, 2023

(65) Prior Publication Data

US 2024/0331352 A1 Oct. 3, 2024

Related U.S. Application Data

(60) Provisional application No. 63/454,852, filed on Mar. 27, 2023.

(51) Int. Cl.
*G06V 20/64* (2022.01)
*G06V 10/50* (2022.01)
(Continued)

(52) U.S. Cl.
CPC ............ *G06V 10/764* (2022.01); *G06V 10/50* (2022.01); *G06V 10/7515* (2022.01); *G06V 20/64* (2022.01)

(58) Field of Classification Search
CPC ...... G06V 10/764; G06V 20/64; G06V 10/50; G06V 10/7515
See application file for complete search history.

(56) References Cited

U.S. PATENT DOCUMENTS 11,321,856 B1 5/2022 Caldwell et al.
2006/0035713 A1 2/2006 Cockerille et al.
(Continued)

FOREIGN PATENT DOCUMENTS

CN 105069623 11/2015
CN 105095707 11/2015
(Continued)

OTHER PUBLICATIONS

KIPO, Notice of Allowance (with English translation) for Korean Patent Application No. 10-2022-7014703, Jul. 4, 2024, 9 pages.
(Continued)

*Primary Examiner* — Syed Haider
(74) *Attorney, Agent, or Firm* — IP Spring

(57) ABSTRACT

Some implementations relate to methods, systems, and computer-readable media for classifying three-dimensional (3D) objects. In some implementations, the method includes generating a plurality of images of a candidate 3D object, determining one or more histogram of oriented gradients (HOG) vectors for each image, determining an asset feature of the candidate 3D object based on the one or more HOG vectors, determining if the asset feature of the candidate 3D object matches an authentic asset feature of at least one authentic 3D object, if the asset feature of the candidate 3D object matches the authentic asset feature of the at least one authentic 3D object, classifying the candidate 3D object as an inauthentic object, and if the asset feature of the candidate 3D object does not match the authentic asset feature of the at least one authentic 3D object, classifying the candidate 3D object as an authentic object.

20 Claims, 9 Drawing Sheets

(51) Int. Cl.
*G06V 10/75* (2022.01)
*G06V 10/764* (2022.01)

(56) References Cited

U.S. PATENT DOCUMENTS

| | | | | |
|---|---|---|---|---|
| 2007/0183669 | A1 | 8/2007 | Owechko et al. | |
| 2008/0112596 | A1 | 5/2008 | Rhoads et al. | |
| 2013/0034337 | A1 | 2/2013 | Hefeeda et al. | |
| 2013/0124359 | A1 | 5/2013 | Hedges et al. | |
| 2014/0139647 | A1 | 5/2014 | Nagatani | |
| 2015/0071486 | A1 | 3/2015 | Rhoads et al. | |
| 2015/0154229 | A1* | 6/2015 | An | G06F 16/583 707/756 |
| 2015/0227784 | A1* | 8/2015 | Roy | G06V 10/457 382/103 |
| 2016/0221114 | A1 | 8/2016 | Dietrich | |
| 2016/0379050 | A1* | 12/2016 | Tian | G06V 40/40 382/118 |
| 2017/0372516 | A1 | 12/2017 | Evans | |
| 2019/0108396 | A1* | 4/2019 | Dal Mutto | G06N 3/047 |
| 2019/0108398 | A1 | 4/2019 | Haghighat | |
| 2019/0180119 | A1* | 6/2019 | Chen | G06V 20/58 |
| 2020/0035011 | A1 | 1/2020 | Bilgili | |
| 2020/0167995 | A1 | 5/2020 | Hare et al. | |
| 2020/0175001 | A1 | 6/2020 | Malan | |
| 2021/0174132 | A1* | 6/2021 | Mayes | A63F 13/35 |
| 2021/0228276 | A1 | 7/2021 | Giraldez et al. | |
| 2021/0350346 | A1 | 11/2021 | Edwards et al. | |
| 2022/0121874 | A1 | 4/2022 | Mayes et al. | |
| 2022/0262020 | A1 | 8/2022 | Caldwell et al. | |
| 2023/0146134 | A1* | 5/2023 | Selviah | G06V 20/653 345/419 |

FOREIGN PATENT DOCUMENTS

| | | |
|---|---|---|
| CN | 105096134 | 11/2015 |
| CN | 106663204 | 5/2017 |
| CN | 108549873 | 9/2018 |
| CN | 112041849 | 12/2020 |
| JP | 2009-048256 | 3/2009 |
| JP | 6746024 | 8/2020 |
| WO | 2014/081394 | 5/2014 |
| WO | 2018/072028 | 4/2018 |
| WO | 2019/207170 | 10/2019 |
| WO | 2021/170972 | 9/2021 |

OTHER PUBLICATIONS

USPTO, Written Opinion for International Patent Application No. PCT/US2024/021437, Jul. 11, 2024, 13 pages.
USPTO, International Search Report for International Patent Application No. PCT/US2024/021437, Jul. 11, 2024, 2 pages.
CNIPA, First Office Action (with English translation) for Chinese Patent Application No. 201980102207.0, Feb. 9, 2025, 30 pages.
CNIPA, Notification of the Decision of Rejection (with English translation) for Chinese Patent Application No. 201980102207.0, Jun. 14, 2025, 32 pages.
EPO, Extended European Search Report for European Patent Application No. 21907663.5, Oct. 25, 2024, 13 pages.
KIPO, Notice of Allowance for Korean Patent Application No. 10-2024-7031852, Oct. 30, 2024, 9 pages.
Lee, et al., “Perceptual 3D model hashing using key-dependent shape feature”, Multimedia tools and applications, vol. 73, 2014, pp. 1723-1755.
JPO, Notice of Allowance (with English translation) for Japanese Patent Application No. 2023-537146, Jun. 10, 2024, 5 pages.
KIPO, First Office Action (with English translation) for Korean Patent Application No. 10-2022-7014703, Apr. 18, 2024, 16 pages.
Bjelland, et al., “Practical use of Approximate Hash Based Matching in digital investigations”, Digital Investigation, vol. 11, Supp. 1, May 2014, pp. S18-S26.
Dalal, et al., “Histograms of Oriented Gradients for Human Detection”, 2005 IEEE computer society conference on computer vision and pattern recognition (CVPR’05), vol. 1., IEEE, 2005, 8 pages.
Huang, et al., “An Accurate Method for Voxelizing Polygon Meshes”, IEEE Symposium on Volume Visualization (Cat. No. 989EX300), 1998, 9 pages.
Jones, “The Production of Volume Data from Triangular Meshes Using Voxelisation”, Computer Graphics Forum, vol. 15, No. 5, Dec. 1996, pp. 311-318.
JPO, Notice of Allowance (with English translation) for Japanese Patent Application No. 2022-529889, Sep. 11, 2023, 3 pages.
Lee, et al., “Robust 3D mesh model hashing based on feature object”, Digital Signal Processing, 22(5), 2012, pp. 744-759.
Liang, et al., “An asymmetric and optimized encryption method to protect the confidentiality of 3D mesh model”, Advanced Engineering Informatics, 42, 100963, 2019.
USPTO, Notice of Allowance for U.S. Appl. No. 17/564,939, Apr. 10, 2023, 8 pages.
USPTO, Notice of Allowance for U.S. Appl. No. 17/127,714, Jan. 7, 2022, 9 pages.
USPTO, Non-final Office Action for U.S. Appl. No. 16/703,823, Jun. 22, 2021, 15 pages.
USPTO, Notice of Allowance for U.S. Appl. No. 17/729,304, Mar. 13, 2023, 9 pages.
USPTO, Non-final Office Action for U.S. Appl. No. 17/729,304, Oct. 25, 2022, 10 pages.
USPTO, Non-final Office Action for U.S. Appl. No. 17/127,714, Sep. 1, 2021, 8 pages.
USPTO, Notice of Allowance for U.S. Appl. No. 16/703,823, Sep. 28, 2021, 7 pages.
WIPO, International Search Report for International Patent Application No. PCT/US2021/063394, Jan. 13, 2022, 2 pages.
WIPO, Written Opinion for International Patent Application No. PCT/US2021/063394, Jan. 13, 2022, 4 pages.
WIPO, International Search Report for International Patent Application No. PCT/US2019/067929, Mar. 18, 2020, 2 pages.
WIPO, Written Opinion for International Patent Application No. PCT/US2019/067929, Mar. 18, 2020, 8 pages.
Zauner, “Implementation and Benchmarking of Perceptual Image Hash Functions”, Sichere Informationssysteme, Hagenberg, 2010, 107 pages.
USPTO, Non-final Office Action for U.S. Appl. No. 18/427,230, Dec. 29, 2025, 20 pages.
CNIPA, Notification to Grant Patent Right for Invention and a Notification to Go through Formalities of Registration for Chinese Patent Application No. 202180085488.0, Dec. 24, 2025, 10 pages.
EPO, Communication Pursuant to Article 94(3) EPC for European Patent Application No. 19955169.8, Dec. 5, 2025, 4 pages,.
USPTO, Final Office Action for U.S. Appl. No. 18/427,230, May 12, 2026, 24 pages.
JPO, Notice of Reasons for Rejection (with English translation) for Japanese Patent Application No. 2025-550657 1, Apr. 28, 2026, 6 pages.
JPO, Notice of Allowance (with English translation) for Japanese Patent Application No. 2025-550657, Jul. 7, 2026, 5 pages.

* cited by examiner

CLASSIFICATION OF THREE-DIMENSIONAL (3D) OBJECTS IN A VIRTUAL ENVIRONMENT

CROSS-REFERENCE TO RELATED APPLICATIONS

This application claims the benefit of priority to U.S. Provisional Application No. 63/454,852, filed on Mar. 27, 2023 and titled CLASSIFICATION OF THREE-DIMENSIONAL (3D) OBJECTS, the entire contents of which are hereby incorporated by reference herein.

TECHNICAL FIELD

Embodiments relate generally to computer-based virtual experiences, and more particularly, to methods, systems, and computer readable media for classification of three-dimensional (3D) objects in a virtual environment and for the detection of counterfeit 3D objects.

BACKGROUND

Some online virtual experience platforms allow users to connect with each other, interact with each other (e.g., within a virtual experience), create virtual experiences, and share information with each other via the Internet. Users of online virtual experience platforms may participate in multiplayer environments (e.g., in virtual three-dimensional environments), design custom environments, design characters, objects, and avatars, decorate avatars, exchange virtual items/objects with other users, communicate with other users using audio or text messaging, and so forth. Environments such as metaverse or multiverse environments can also enable users that participate to share, sell, or trade objects of their creation with other users.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes generating a plurality of images of a candidate 3D object, where each image of the plurality of images of the candidate 3D object is from a respective camera position of two or more camera positions; determining one or more histogram of oriented gradients (HoG) vectors for each image of the plurality of images of the candidate 3D object; determining an asset feature of the candidate 3D object based on the one or more HoG vectors for each of the plurality of images of the candidate 3D object; determining if the asset feature of the candidate 3D object matches an authentic asset feature of at least one authentic 3D object; if the asset feature of the candidate 3D object matches the authentic asset feature of the at least one authentic 3D object, classifying the candidate 3D object as an inauthentic object; and if the asset feature of the candidate 3D object does not match the authentic asset feature of the at least one authentic 3D object, classifying the candidate 3D object as an authentic object. Other embodiments of this aspect include corresponding computer systems, apparatus, and computer programs recorded on one or more computer storage devices, each configured to perform the actions of the methods.

Implementations may include the computer-implemented method where determining if the asset feature of the candidate 3D object matches an authentic asset feature of at least one authentic 3D object may include calculating a vector distance between the asset feature of the candidate 3D object and the authentic asset feature of the at least one authentic 3D object, and where it is determined that the asset feature of the candidate 3D object matches the authentic asset feature of the at least one authentic 3D object if the vector distance meets a predetermined threshold. Determining if the asset feature of the candidate 3D object matches an authentic asset feature of at least one authentic 3D object may include performing a rotationally invariant comparison of the asset feature of the candidate 3D object and the authentic asset feature of the at least one authentic 3D object. Performing the rotationally invariant comparison of the asset feature of the candidate 3D object and the authentic asset feature of the at least one authentic 3D object may include: generating a plurality of rolled asset feature vectors of the candidate 3D object based on the asset feature of the candidate 3D object, where each rolled asset feature vector corresponds to a particular orientation of the candidate 3D object; and comparing each of the plurality of rolled asset feature vectors with the authentic asset feature of the at least one authentic 3D object. Determining the one or more HoG vectors may include determining one or more pyramidal HoG vectors, and where each of the one or more pyramidal HoG vectors is generated by concatenating HoG vectors of the candidate 3D object generated at multiple resolutions of a respective image of the plurality of images of the candidate 3D object. Generating the plurality of images of the candidate 3D object may include generating the plurality of images at one or more azimuth and elevation points. Generating the image of the candidate 3D object may include adjusting a camera view during capture of the image such that the candidate 3D object occupies at least a predetermined area of the image. The computer-implemented method may include prior to generating the plurality of images of the candidate 3D object, replacing a texture of the candidate 3D object with a white plastic material. Classifying the candidate 3D object as the authentic object further may include assigning a flag to the candidate 3D object, and where the flag is readable by a game engine and causes the game engine to enable use of the candidate 3D object in a virtual environment hosted by the game engine. Classifying the candidate 3D object as the inauthentic object further may include assigning a flag to the candidate 3D object, and where the flag is readable by a game engine and causes the game engine to prevent use of the candidate 3D object in a virtual environment hosted by the game engine. Determining if the asset feature of the candidate 3D object matches the authentic asset feature of at least one authentic 3D object may include performing a comparison of a reduced dimension asset feature of the candidate 3D object against a reduced dimension authentic asset feature of the at least one authentic 3D object. Implementations of the described techniques may include hardware, a method or process, or computer software on a computer-accessible medium.

One general aspect includes a non-transitory computer-readable medium that may include instructions that when executed causes generating a plurality of images of a candidate 3D object, where each image of the plurality of images of the candidate 3D object is from a respective camera position of two or more camera positions; determining one or more histogram of oriented gradients (HoG) vectors for each image of the plurality of images of the candidate 3D object; determining an asset feature of the candidate 3D object based on the one or more HoG vectors for each of the plurality of images of the candidate 3D object; determining if the asset feature of the candidate 3D object matches an authentic asset feature of at least one authentic 3D object; if the asset feature of the candidate 3D object matches the authentic asset feature of the at least one authentic 3D object, classifying the candidate 3D object as an inauthentic object; and if the asset feature of the candidate 3D object does not match the authentic asset feature of the at least one authentic 3D object, classifying the candidate 3D object as an authentic object. Other embodiments of this aspect include corresponding computer systems, apparatus, and computer programs recorded on one or more computer storage devices, each configured to perform the actions of the methods.

Implementations may include the non-transitory computer-readable medium where determining if the asset feature of the candidate 3D object matches an authentic asset feature of at least one authentic 3D object may include calculating a vector distance between the asset feature of the candidate 3D object and the authentic asset feature of the at least one authentic 3D object, and where it is determined that the asset feature of the candidate 3D object matches the authentic asset feature of the at least one authentic 3D object if the vector distance meets a predetermined threshold. Determining the one or more HoG vectors may include determining one or more pyramidal HoG vectors, and where each of the one or more pyramidal HoG vectors is generated by concatenating HoG vectors of the candidate 3D object generated at multiple resolutions of a respective image of the plurality of images of the candidate 3D object. Implementations of the described techniques may include hardware, a method or process, or computer software on a computer-accessible medium.

One general aspect includes a system that includes a memory with instructions stored thereon; and a processing device, coupled to the memory, the processing device configured to access the memory and execute the instructions, where the instructions cause the processing device to perform operations including: generating a plurality of images of a candidate 3D object, where each image of the plurality of images of the candidate 3D object is from a respective camera position of two or more camera positions; determining one or more histogram of oriented gradients (HoG) vectors for each image of the plurality of images of the candidate 3D object; determining an asset feature of the candidate 3D object based on the one or more HoG vectors for each of the plurality of images of the candidate 3D object; determining if the asset feature of the candidate 3D object matches an authentic asset feature of at least one authentic 3D object; if the asset feature of the candidate 3D object matches the authentic asset feature of the at least one authentic 3D object, classifying the candidate 3D object as an inauthentic object; and if the asset feature of the candidate 3D object does not match the authentic asset feature of the at least one authentic 3D object, classifying the candidate 3D object as an authentic object. Other embodiments of this aspect include corresponding computer systems, apparatus, and computer programs recorded on one or more computer storage devices, each configured to perform the actions of the methods.

Implementations may include the system where determining if the asset feature of the candidate 3D object matches an authentic asset feature of at least one authentic 3D object may include calculating a vector distance between the asset feature of the candidate 3D object and the authentic asset feature of the at least one authentic 3D object, and where it is determined that the asset feature of the candidate 3D object matches the authentic asset feature of the at least one authentic 3D object if the vector distance meets a predetermined threshold. Determining the one or more HoG vectors may include determining one or more pyramidal HoG vectors, and where each of the one or more pyramidal HoG vectors is generated by concatenating HoG vectors of the candidate 3D object generated at multiple resolutions of a respective image of the candidate 3D object. Determining if the asset feature of the candidate 3D object matches an authentic asset feature of at least one authentic 3D object may include performing a rotationally invariant comparison of the asset feature of the candidate 3D object and the authentic asset feature of the at least one authentic 3D object. The operations further may include, prior to generating the plurality of images of the candidate 3D object, replacing a texture of the candidate 3D object with a white plastic material. The operations further may include reducing a dimension of the asset feature, and where determining if the asset feature of the candidate 3D object matches the authentic asset feature of at least one authentic 3D object may include performing a comparison of a reduced dimension asset feature of the candidate 3D object against a reduced dimension authentic asset feature of the at least one authentic 3D object. Implementations of the described techniques may include hardware, a method or process, or computer software on a computer-accessible medium.

DETAILED DESCRIPTION

Figure 1:
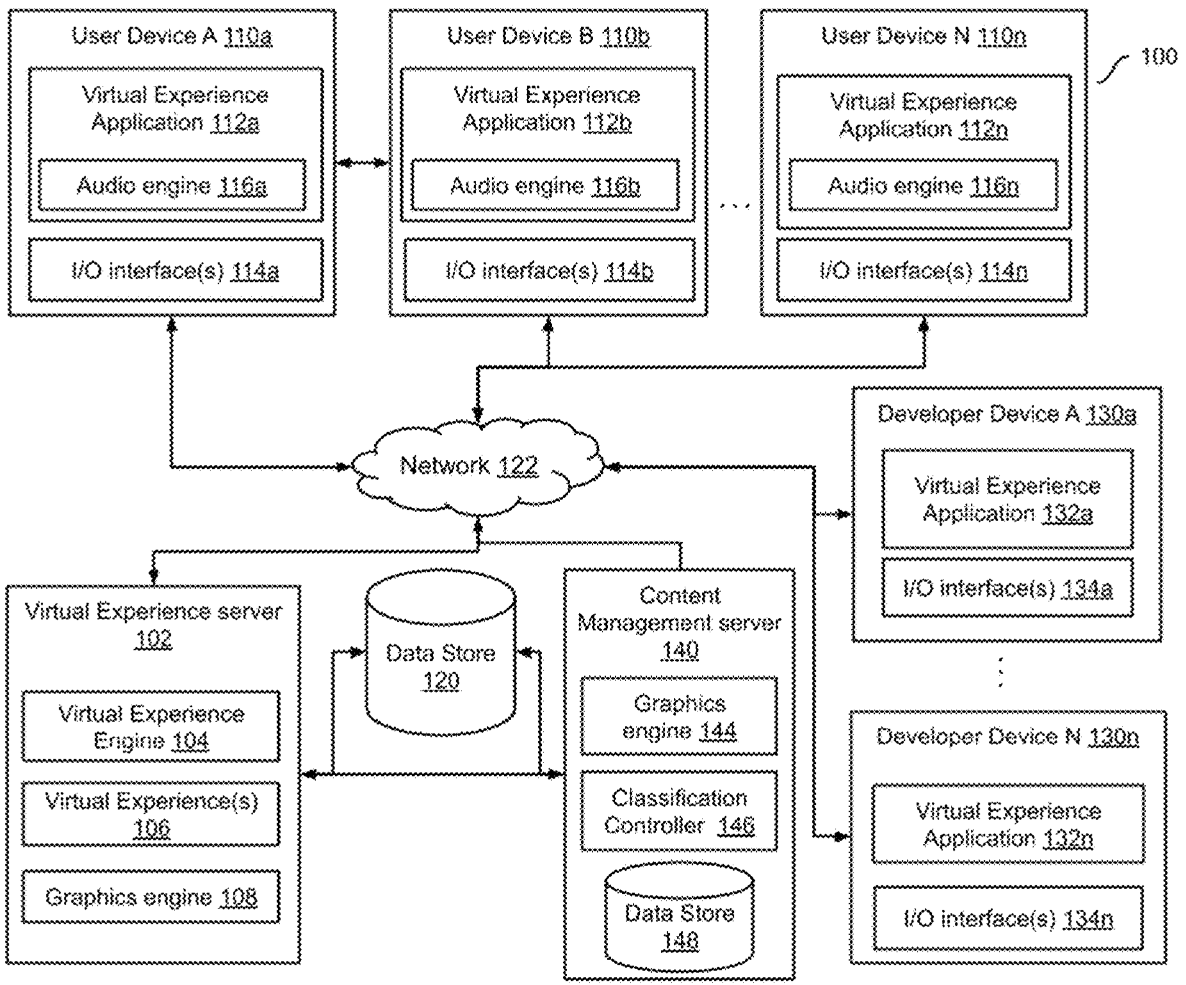
FIG. 1 is a diagram of an example environment in which classification of three-dimensional (3D) objects is performed, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some embodiments", "an embodiment", "an example embodiment", etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

Online virtual experience platforms (also referred to as "user-generated content platforms" or "user-generated content systems") offer a variety of ways for users to interact with one another. For example, users of an online virtual experience platform may work together towards a common goal, share various virtual experience items, send electronic messages to one another, and so forth. Users of an online virtual experience platform may join virtual experience(s), e.g., games or other experiences as virtual characters, playing specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

A virtual experience platform (or online gaming platform) may enable users (developers) of the platform to create objects, new games, and/or characters. For example, users of the virtual experience platform/online gaming platform may be enabled to create, design, and/or customize new characters (avatars), new animation packages, new three-dimensional objects, etc. and make them available to other users.

Objects, e.g., virtual objects, may be traded, bartered, or bought and sold in online marketplaces for virtual and/or real currency. A virtual object may be offered within a virtual experience or virtual environment in any quantity, such that there may be a single instance ("unique object"), very few instances ("rare object"), a limited number of instances ("limited quantity"), or unlimited number of instances ("common object") of a particular object within the virtual experience or environment. Permitting an object creator to set a limit of the number of instances of the object can enable creators to charge different prices (e.g., in virtual or real currency) for their creations and allow a virtual economy to emerge where different objects are priced differently.

However, as virtual objects may be representations generated from information, e.g., an object mesh that defines object structure (e.g., shape) and motion (e.g., rotation, translation, etc.), a texture that defines the surface of the object (e.g., object color, object surface properties such as how light reflects off the object, etc.), and/or other attributes, it may be possible for objects to be copied by other creators. Such copied objects may be termed inauthentic or counterfeit objects. The counterfeit objects may be copied and redistributed without the reseller's or purchaser's awareness of the counterfeit nature of the virtual object(s). Presence of such counterfeit objects may be detrimental to the virtual experience or environment, e.g., since counterfeit objects may be confused by users as being authentic, counterfeit objects may have different properties than an authentic object, etc. and may affect the user enjoyment of the virtual experience as well as transactions for virtual objects between users. Users of a virtual experience platform as well as platform providers may thus benefit from techniques to automatically detect counterfeit or inauthentic objects.

Flooding or presence of counterfeit objects in a virtual experience, a virtual environment, or a virtual marketplace can be difficult to detect, and the volume and nature of the virtual objects can make it difficult for human intervention (manual detection) in the detection of the counterfeit virtual objects, e.g., since human detection may not be scalable to a large number, e.g., millions of objects.

An objective of a virtual experience platform owner or administrator is the mitigation of counterfeit objects to protect creators of original content. A technical problem for operators and/or administrators of virtual experience platforms is automatic, accurate, scalable, cost-effective, and reliable classification of 3D objects and detection of inauthentic (counterfeit) objects across the platform(s).

Detection of inauthentic (counterfeit) objects may make it difficult and/or expensive for a creator of an inauthentic object to create and propagate inauthentic virtual objects. A virtual experience platform that prevents the upload and/or display of inauthentic objects can effectively deter inauthentic object creators as well as incentivize creators of authentic objects.

In order to circumvent detection, malicious creators can sometimes manipulate an original object to create a manipulated object. The manipulated object may be classified by some counterfeit detection techniques as original, even though the difference between the manipulated object and the genuine (authentic) object may not be perceptible to a user of the manipulated object when the manipulated object is placed in a virtual experience.

The present disclosure addresses the above-described drawbacks by providing techniques to automatically detect inauthentic objects that are similar to genuine objects that are known to the virtual experience platform/game platform. Geometric similarities of the counterfeit virtual object to an authentic (original) virtual object are utilized for the classification of 3D objects and for the detection of inauthentic 3D objects.

A technical problem for virtual experience platform operators is classification of digital assets and the accurate detection of inauthentic digital assets. Implementations are described herein to automatically classify and detect inauthentic 3D objects on a virtual experience platform/game platform.

Classification of 3D objects and the detection of inauthentic 3D objects pose a number of technical problems and challenges. These include accurate determination of size, orientation, features, texture, etc. of a candidate 3D object during comparison with authentic 3D objects, which may also be associated with a respective size, orientation, features, texture, etc.

This disclosure describes techniques that address the aforementioned problems and enable classification of candidate 3D objects and detection of inauthentic 3D objects that may be imitations of authentic 3D objects. Techniques are described that take into account the entire geometry of the 3D assets and that do not rely on a thumbnail view. A vector representation (asset feature vector) of the 3D object geometry is specified and generated in a manner such that 3D objects with similar geometrical structures yield asset feature vectors that are close to each other in a vector space, and 3D objects with dissimilar geometrical structures yield asset feature vectors that are distant from each other in the vector space.

A 3D model of the 3D object, e.g., a 3D mesh (that includes two or more vertices or joints and rigid and/or connections or edges between the vertices) is obtained, and images are taken of the candidate 3D object at one or more camera positions. Multiple different camera positions provide images associated with various respective orientations of the candidate 3D object and enable better detection of inauthentic 3D objects.

Based on the captured images, feature vectors for each image are generated based on histogram of oriented gradients (HOG or HoG) vectors that are embeddings representative of each image. In some implementations, pyramidal HOG (P-HOG) vectors are utilized that are based on HOG vectors calculated from images at different resolutions.

In some implementations, an asset feature vector may be generated by concatenating pyramidal HOG vectors obtained from each image. This provides an asset feature that provides scale invariance and a progressive geometric space for the feature vector. The progressive geometric space of the asset feature vector provides detection of degrees of similarity between candidate 3D objects and authentic 3D objects. For example, clearly similar 3D objects and clearly different 3D objects can be automatically classified, and candidate 3D objects with feature vectors that lie within threshold ranges of distance from feature vectors of authentic 3D objects can be flagged for classification with human inputs. Thresholds can be chosen to ensure that false positives (objects flagged as potential counterfeit, but not counterfeit) as well as false negatives (counterfeit objects that go undetected by the comparison) meet performance requirements (e.g., scalability and reliability).

Based on the asset feature vector, a computationally efficient reduced-dimension asset feature vector may be generated by performing a principal component analysis (PCA) or Principal Coordinate Analysis (PCoA) operation on the asset feature vector.

Additionally, a comparison between candidate 3D objects and authentic 3D objects may be performed in a rotation invariant manner by generating rolled versions of the asset feature vector, or by utilizing spherical harmonics to transform the asset feature vector.

In some implementations, textures associated with the candidate 3D object may be replaced with a white cloth (or other neutral texture) prior to generation of the HOG vectors to enable standardization of asset feature vectors across candidate objects.

FIG. 1 is a diagram of an example system architecture for classification of three-dimensional (3D) objects, in accordance with some implementations. FIG. 1 and other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g., "110" in the text refers to reference numerals "110*a*," "110*b*," and/or "110*n*" in the figures).

The system architecture 100 (also referred to as "system" herein) includes online virtual experience server 102, data store 120, user devices 110*a*, 110*b*, and 110*n* (generally referred to as "user device(s) 110" herein), and developer devices 130*a* and 130*n* (generally referred to as "developer device(s) 130" herein), virtual experience server 102, content management server 140, data store 120, user devices 110, and developer devices 130 are coupled via network 122. In some implementations, user devices(s) 110 and developer device(s) 130 may refer to the same or same type of device.

Online virtual experience server 102 can include a virtual experience engine 104, one or more virtual experience(s) 106, and graphics engine 108. A user device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc. The input/output devices can also include accessory devices that are connected to the user device by means of a cable (wired) or that are wirelessly connected.

Content management server 140 can include a graphics engine 144, and a classification controller 146. In some implementations, the content management server may include a plurality of servers. In some implementations, the plurality of servers may be arranged in a hierarchy, e.g., based on respective prioritization values assigned to content sources.

Graphics engine 144 may be utilized for the rendering of one or more objects, e.g., 3D objects associated with the virtual environment. Classification controller 146 may be utilized to classify assets such as 3D objects and for the detection of inauthentic digital assets, etc. Data store 148 may be utilized to store a search index, model information, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, a cloud storage system, or another type of component or device capable of storing data. The data store 120 may also include multiple storage components (e.g., multiple drives or multiple databases) that may also span multiple computing devices (e.g., multiple server computers).

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, a distributed computing system, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on user devices 110.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be an online gaming server. For example, the virtual experience server may provide single-player or multiplayer games to a community of users that may access or interact with games using user devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using user devices (e.g., 110) within a game (e.g., game that is part of virtual experience 106) or the presentation of the interaction on a display or other output device (e.g., 114) of a user device 110.

In some implementations, a virtual experience 106 can include an electronic file that can be executed or loaded using software, firmware or hardware configured to present the game content (e.g., digital media item) to an entity. In some implementations, a virtual experience application 112 may be executed and a virtual experience 106 executed in connection with a virtual experience engine 104. In some implementations, a virtual experience (e.g., a game) 106 may have a common set of rules or common goal, and the environment of a virtual experience 106 shares the common set of rules or common goal. In some implementations, different games may have different rules or goals from one another.

In some implementations, virtual experience(s) may have one or more environments (also referred to as "gaming environments" or "virtual environments" herein) where multiple environments may be linked. An example of an environment may be a three-dimensional (3D) environment. The one or more environments of a virtual experience application 106 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online virtual experience server 102 can host one or more virtual experiences 106 and can permit users to interact with the virtual experiences 106 using a virtual experience application 112 of user devices 110. Users of the online virtual experience server 102 may play, create, interact with, or build virtual experiences 106, communicate with other users, and/or create and build objects (e.g., also referred to as "item(s)" or "game objects" or "virtual game item(s)" herein) of virtual experiences 106. For example, in generating user-generated virtual items, users may create characters, decoration for the characters, one or more virtual environments for an interactive game, or build structures used in a game. In some implementations, users may buy, sell, or trade virtual game objects, such as in-platform currency (e.g., virtual currency), with other users of the online virtual experience server 102. In some implementations, online virtual experience server 102 may transmit game content to virtual experience applications (e.g., 112). In some implementations, game content (also referred to as "content" herein) may refer to any data or software instructions (e.g., game objects, game, user information, video, images, commands, media item, etc.) associated with online virtual experience server 102 or virtual experience applications. In some implementations, game objects (e.g., also referred to as "item(s)" or "objects" or "virtual objects" or "virtual game item(s)" herein) may refer to objects that are used, created, shared, or otherwise depicted in virtual experience applications 106 of the online virtual experience server 102 or virtual experience applications 112 of the user devices 110. For example, game objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration, rather than limitation. In some implementations, online virtual experience server 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual application 106 may be associated with a particular user or a particular group of users (e.g., a private game), or made widely available to users with access to the online virtual experience server 102 (e.g., a public game). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or user devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the game (e.g., rendering commands, collision commands, physics commands, etc.) In some implementations, virtual experience applications 112 of user devices 110, may work independently, in collaboration with virtual experience engine 104 of online virtual experience server 102, or a combination of both.

In some implementations, both the online virtual experience server 102 and user devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of user device 110. In some implementations, each virtual application 106 may have a different ratio between the virtual experience engine functions that are performed on the online virtual experience server 102 and the virtual experience engine functions that are performed on the user devices 110. For example, the virtual experience engine 104 of the online virtual experience server 102 may be used to generate physics commands in cases where there is a collision between at least two virtual application objects, while the additional virtual experience engine functionality (e.g., generate rendering commands) may be offloaded to the user device 110. In some implementations, the ratio of virtual experience engine functions performed on the online virtual experience server 102 and user device 110 may be changed (e.g., dynamically) based on gameplay conditions. For example, if the number of users participating in gameplay of a particular virtual application 106 exceeds a threshold number, the online virtual experience server 102 may perform one or more virtual experience engine functions that were previously performed by the user devices 110.

For example, users may be playing a virtual application 106 on user devices 110, and may send control instructions (e.g., user inputs, such as right, left, up, down, user election, or character position and velocity information, etc.) to the online virtual experience server 102. Subsequent to receiving control instructions from the user devices 110, the online virtual experience server 102 may send gameplay instructions (e.g., position and velocity information of the characters participating in the group gameplay or commands, such as rendering commands, collision commands, etc.) to the user devices 110 based on control instructions. For instance, the online virtual experience server 102 may perform one or more logical operations (e.g., using virtual experience engine 104) on the control instructions to generate gameplay instruction(s) for the user devices 110. In other instances, online virtual experience server 102 may pass one or more or the control instructions from one user device 110 to other user devices (e.g., from user device 110*a* to user device 110*b*) participating in the virtual application 106. The user devices 110 may use the gameplay instructions and render the gameplay for presentation on the displays of user devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a user device 110 to another user device (e.g., from user device 110*b* to user device 110*n*), where the other user device generates gameplay instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a user device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, the online virtual experience server 102 may store characters created by users in the data store 120. In some implementations, the online virtual experience server 102 maintains a character catalog and game catalog that may be presented to users. In some implementations, the game catalog includes images of virtual experiences stored on the online virtual experience server 102. In addition, a user may select a character (e.g., a character created by the user or other user) from the character catalog to participate in the chosen game. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the virtual experience platform may support three-dimensional (3D) objects that are represented by a 3D model and includes a surface representation used to draw the character or object (also known as a skin or mesh) and a hierarchical set of interconnected bones (also known as a skeleton or rig). The rig may be utilized to animate the object and to simulate motion of the object. The 3D model may be represented as a data structure, and one or more parameters of the data structure may be modified to change various properties of the character, e.g., dimensions (height, width, girth, etc.); shape; movement style; number/type of parts; proportion, etc.

In some implementations, the 3D model may include a 3D mesh. The 3D mesh may define a three-dimensional structure of the unauthenticated virtual 3D object. In some implementations, the 3D mesh may also define one or more surfaces of the 3D object. In some implementations, the 3D object may be a virtual avatar, e.g., a virtual character such as a humanoid character, an animal-character, a robot-character, etc.

In some implementations, the mesh may be received (imported) in a FBX file format. The mesh file includes data that provides dimensional data about polygons that comprise the virtual 3D object and UV map data that describes how to attach portions of texture to various polygons that comprise the 3D object. In some implementations, the 3D object may correspond to an accessory, e.g., a hat, a weapon, a piece of clothing, etc. worn by a virtual avatar or otherwise depicted with reference to a virtual avatar.

In some implementations, a platform may enable users to submit (upload) candidate 3D objects for utilization on the platform. A virtual experience development environment (developer tool) may be provided by the platform, in accordance with some implementations. The virtual experience development environment may provide a user interface that enables a developer user to design and/or create virtual experiences, e.g., games. One example of the virtual experience development environment is Roblox™ Studio from Roblox™ Corporation. Other development tools and development environments provided by other companies may be used in various embodiments. The virtual experience development environment may be a client-based tool (e.g., downloaded and installed on a client device, and operated from the client device), a server-based tool (e.g., installed and executed at a server that is remote from the client device, and accessed and operated by the client device), or a combination of both client-based and service-based elements.

The virtual experience development environment may be operated by a developer of a virtual experience, e.g., a game developer or any other person who seeks to create a virtual experience that may be published by an online virtual experience platform and utilized by others. The user interface of the virtual experience development environment may be rendered on a display screen of a client device, e.g., such as a developer device 130 described with reference to FIG. 1, so as to enable the creator/developer to interact with the development environment using actions such as typing, highlighting, selecting, drag and drop, clicking, and so forth via a mouse, keyboard, or other input device configured to communicate with the user interface. The user interface may include a menu bar, a tool bar, a workspace pane, and a plurality of secondary panes. Depending on the particular implementation, the user interface may include alternative or additional elements, arrangements, operational features, etc. of the virtual experience development environment than what is shown and described herein.

A developer user (creator) may utilize the virtual experience development environment to create virtual experiences. As part of the development process, the developer/creator may upload various types of digital content such as object files (meshes), image files, audio files, short videos, etc., to enhance the virtual experience.

In implementations where the candidate (unauthenticated) 3D object is an accessory, data indicative of use of the object in a virtual experience may also be received. For example, a "shoe" object may include annotations indicating that the object can be depicted as being worn on the feet of a virtual humanoid character, while a "shirt" object may include annotations that it may be depicted as being worn on the torso of a virtual humanoid character.

In some implementations, the 3D model may further include texture information associated with the 3D object. For example, texture information may indicate color and/or pattern of an outer surface of the 3D object. The texture information may enable varying degrees of transparency, reflectiveness, degrees of diffusiveness, material properties, and refractory behavior of the textures and meshes associated with the 3D object. Examples of textures include plastic, cloth, grass, a pane of light blue glass, ice, water, concrete, brick, carpet, wood, etc.

In some implementations, the user device(s) 110 may each include computing devices such as personal computers (PCs), mobile devices (e.g., laptops, mobile phones, smart phones, tablet computers, or netbook computers), network-connected televisions, gaming consoles, etc. In some implementations, a user device 110 may also be referred to as a "client device." In some implementations, one or more user devices 110 may connect to the online virtual experience server 102 at any given moment. It may be noted that the number of user devices 110 is provided as illustration. In some implementations, any number of user devices 110 may be used.

In some implementations, each user device 110 may include an instance of the virtual experience application 112, respectively. In one implementation, the virtual experience application 112 may permit users to use and interact with online virtual experience server 102, such as control a virtual character in a virtual game hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a gaming program) that is installed and executes local to user device 110 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

In some implementations, the virtual experience application may include an audio engine 116 that is installed on the user device, and which enables the playback of sounds on the user device. In some implementations, audio engine 116 may act cooperatively with audio engine 144 that is installed on the sound server.

According to aspects of the disclosure, the virtual experience application may be an online virtual experience server application for users to build, create, edit, upload content to the online virtual experience server 102 as well as interact with online virtual experience server 102 (e.g., participate in virtual experiences 106 hosted by online virtual experience server 102). As such, the virtual experience application may be provided to the user device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 122 may permit a developer user(s) to use and interact with online virtual experience server 102, such as control a virtual character in a virtual game hosted by online virtual experience server 102, or view or upload content, such as games 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, or a virtual experience program) that is installed and executes local to user device 130 and allows users to interact with online virtual experience server 102. The virtual experience application may render, display, or present the content (e.g., a web page, a media viewer) to a user. In an implementation, the virtual experience application may also include an embedded media player (e.g., a Flash® player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or play games 106 hosted by online virtual experience server 102). As such, the virtual experience application may be provided to the user device(s) 130 by the online virtual experience server 102. In another example, the virtual experience application 132 may be an application that is downloaded from a server. Virtual experience application 132 may be configured to interact with online virtual experience server 102 and obtain access to user credentials, user currency, etc. for one or more virtual applications 106 developed, hosted, or provided by a virtual experience application developer.

In some implementations, a user may login to online virtual experience server 102 via the virtual experience application. The user may access a user account by providing user account information (e.g., username and password) where the user account is associated with one or more characters available to participate in one or more games 106 of online virtual experience server 102. In some implementations, with appropriate credentials, a virtual experience application developer may obtain access to virtual experience application objects, such as in-platform currency (e.g., virtual currency), avatars, special powers, accessories, that are owned by or associated with other users.

In general, functions described in one implementation as being performed by the online virtual experience server 102 can also be performed by the user device(s) 110, or a server, in other implementations if appropriate. In addition, the functionality attributed to a particular component can be performed by different or multiple components operating together. The online virtual experience server 102 can also be accessed as a service provided to other systems or devices through appropriate application programming interfaces (APIs), and thus is not limited to use in websites.

In some implementations, online virtual experience server 102 may include a graphics engine 108. In some implementations, the graphics engine 108 may be a system, application, or module that permits the online virtual experience server 102 to provide graphics and animation capability. In some implementations, the graphics engine 108, and/or content management server 140 may perform one or more of the operations described below in connection with the flow chart shown in FIG. 5.

Figure 2:
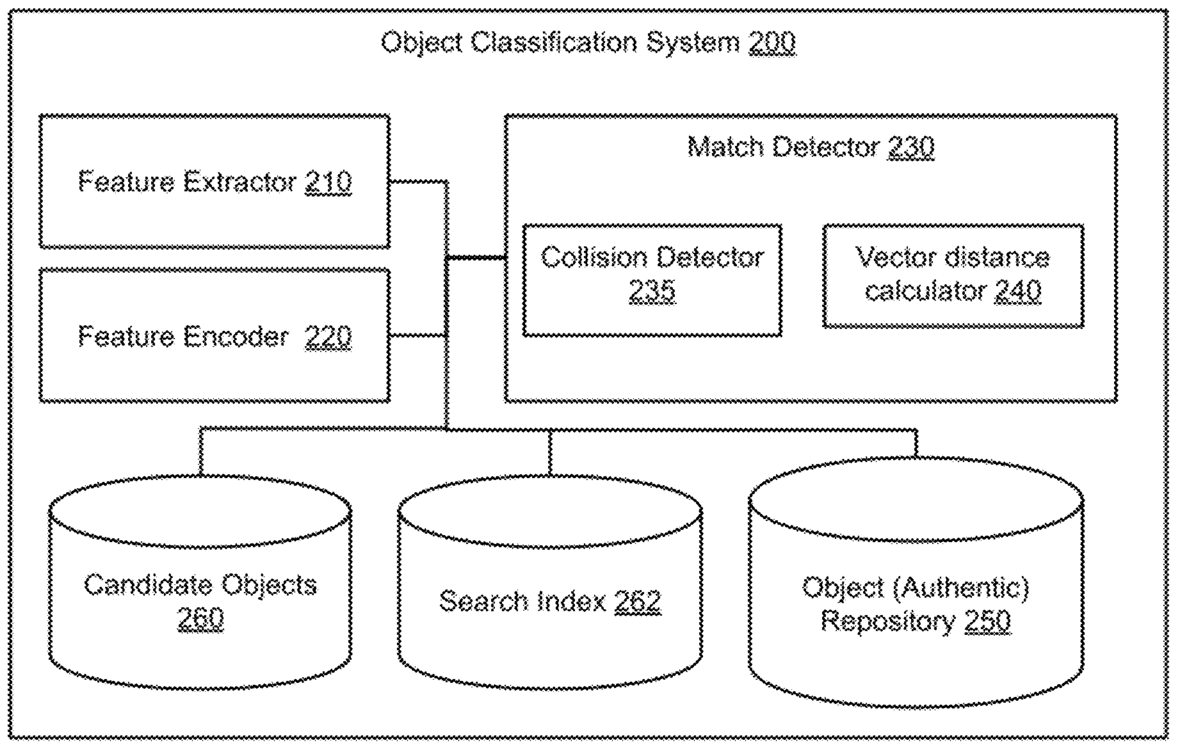
FIG. 2 illustrates an example of a system architecture to classify three-dimensional (3D) objects, in accordance with some implementations.

FIG. 2 illustrates an example system architecture for classification of three-dimensional (3D) objects, in accordance with some implementations.

As depicted in FIG. 2, object classification system 200 includes modules for classification of candidate 3D objects and for the detection of inauthentic 3D objects.

The object classification system includes a module for feature extraction 210, a feature encoder 220, and a match detector 230. Match detector includes a collision detector 235 and a vector distance calculator 240. The object classification system additionally includes data stores to store authentic 3D objects and candidate 3D objects; object repository 250, candidate objects 260, and a search index 262.

The object repository 250 may be utilized to store authentic 3D objects utilized across a platform. The storage may support scenarios where a particular 3D object is utilized in a single virtual experience as well as where a particular asset (e.g., 3D object) is utilized in multiple virtual experiences across the virtual experience platform.

The candidate objects storage 260 is utilized to include candidate 3D objects that may be received at the platform (e.g., from developers/creators that create the object using on-platform or off-platform tools) for storage prior to their classification (and/or use on the platform). The candidate 3D objects may be received from users, e.g., develop users for use on the platform. The 3D objects may be made available for free or for purchase on the platform by users, e.g., developer users and content creators on the platform.

The search index 262 is an index of asset feature vectors of authentic 3D objects to enable efficient and timely search of asset feature vectors of authentic 3D objects.

Feature extractor 210 may be utilized to generate images of 3D objects, e.g., authentic 3D objects, candidate 3D objects, etc.

Feature encoder 220 may implement suitable techniques to generate asset features and/or embeddings for 3D objects based on the images of the 3D objects. In some implementations, the feature extractor and feature encoder may be utilized to generate vector representations of the 3D objects that can be utilized for the classification of 3D objects and for the detection of inauthentic candidate 3D objects. In some implementations, the feature extractor and feature encode may include support for different types of embeddings that may be based on a type of 3D object for which the asset feature is to be generated. In some implementations, the embeddings may be based on a pyramidal histogram of oriented gradients (HOG) of a candidate 3D object.

In some implementations, match detector 230 may compare candidate 3D objects with authentic 3D objects by utilizing suitable algorithms, e.g., algorithms described with reference to block 525 in FIG. 5. The collision detector 235 and vector distance calculator 240 may be utilized to perform a comparison of candidate 3D objects with authentic 3D objects.

In some implementations, match detector 230 may implement one or more hashing techniques to determine inauthentic candidate 3D objects. For example, one or more hashing techniques may be utilized to match the hashes of candidate 3D objects with reference hashes of authentic 3D objects.

Figure 3A:
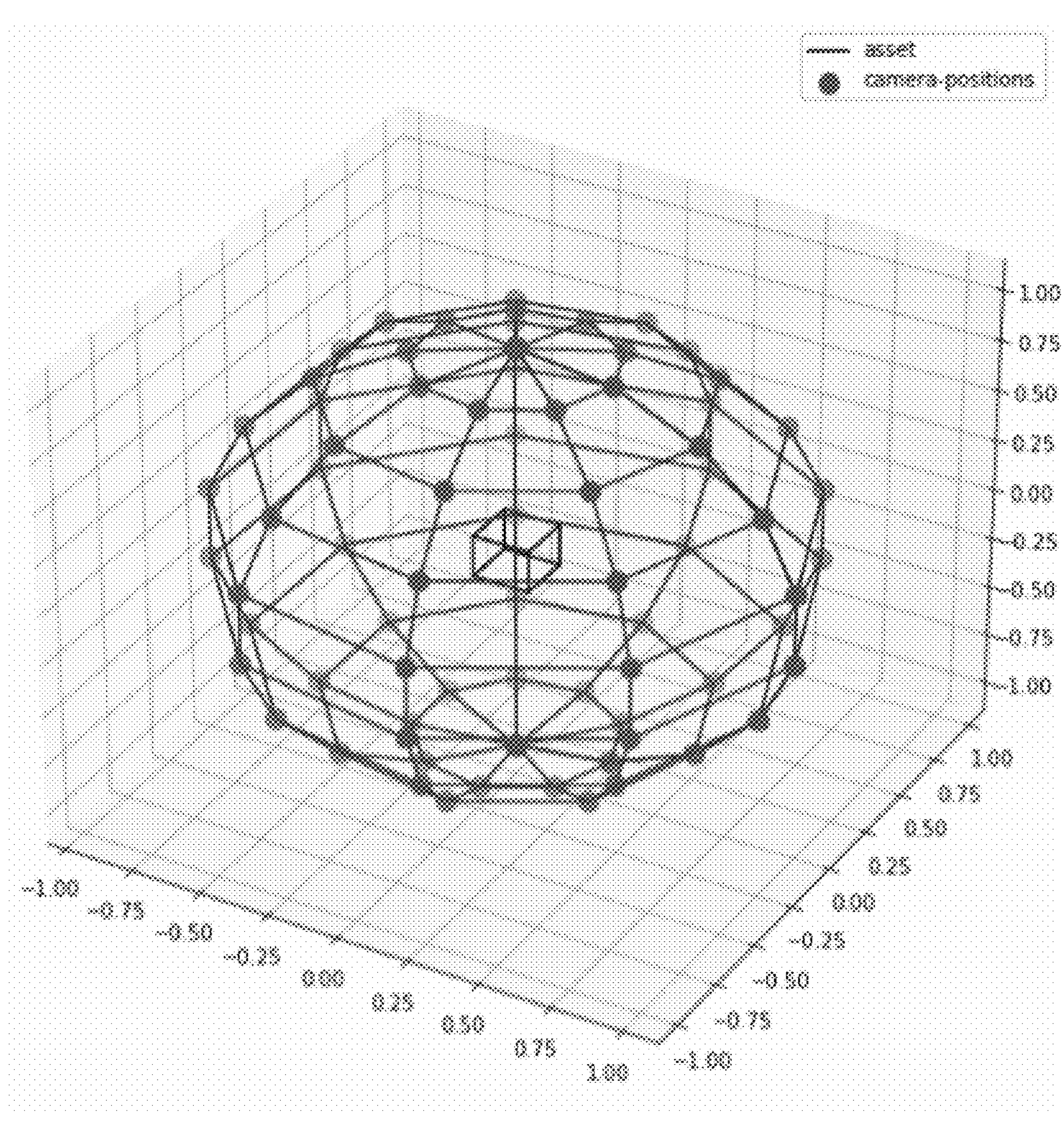
FIG. 3A is a diagram that illustrates example camera positions utilized to capture images of a 3D object, in accordance with some implementations.

FIG. 3A is a diagram that illustrates example camera positions utilized to capture images of a 3D object, in accordance with some implementations.

Geometric details of a 3D object, e.g., a candidate 3D object, are captured by generating custom views of the 3D object from different viewpoints. The custom views may be generated by rendering the 3D object, e.g., based on a 3D model of the candidate 3D object, within a standardized rendering environment. Standardization may include applying a standard texture (e.g., white plastic) to the object, uniform lighting (e.g., to ensure that all objects are imaged in similar lighting conditions, enabling comparison), and using standard camera settings for the virtual cameras.

Prior to capture of the images, the rendering environment (scene) in which the candidate 3D object is placed may be configured with uniform lighting. The lighting is standardized across all image captures that are utilized to generate images for 3D object classification to ensure accurate results. For example, the same lighting settings utilized to generate images of authentic 3D objects may be utilized to generate images of candidate 3D objects.

In some implementations, a camera distance from the candidate 3D object is determined by determining a field of view of the camera and ensuring that the 3D object occupies at least a fixed percentage of the captured image. This can ensure that the generated captured image is invariant to the changes in the size of the candidate 3D object, when compared to authentic 3D objects.

In some implementations, a modified Ritter's algorithm may be utilized for scale calculation and to determine the camera distance from the object. The following computations may be performed, per Ritter's algorithm.

Upon rendering the candidate 3D object, the minimum and maximum coordinate points (x, y) of the input points along the surface of the candidate 3D object are determined. This computation can be performed efficiently (in linear time). A diameter of the point set is determined by computing a Euclidean distance between the two points that lie at the greatest distance from one another. This can also be performed in linear time using an efficient technique, such as by utilizing a rotating calipers algorithm. A midpoint of the diameter is determined, which denotes a center of an initial bounding circle. The radius of the bounding circle is determined, which is half of the previously determined diameter.

This process is repeated for all points in the rendered set, and for each point that is not inside the bounding circle, its distance is computed from the center of the bounding circle. If this computed distance is greater than the radius of the currently utilized bounding circle, the bounding circle is expanded with its set to be equal to the computed distance, and a center of the updated bounding circle is set to be the midpoint between the point and a center of the previously utilized bounding circle. This is repeated, e.g., until all points have been processed.

In some implementations, additional steps may be performed to further enhance fraud detection, e.g., of fraudulent duplicate 3D model submissions that may manipulate the scale of the object. In some implementations, an increase in radius with the addition of a new vertex is analyzed and based on a determination that an increase in radius due to the addition of a new vertex (point) meets a predetermined threshold, the newly added vertex may be excluded from the computation of the radius of the bounding circle.

In some implementations, for each point (P) or vertex, the squared distance between P and a center of the bounding circle is determined. If the inclusion of P causes a sudden increase in radius and the distance exceeds the squared radius, the vertex is excluded from further consideration. The radius and center of the bounding circle is updated based on the remaining valid vertices and utilized to calculate the final radius of the bounding sphere.

Two or more camera viewpoints (camera locations) are selected within the rendering environment to provide multiple views of the candidate 3D object. The number of camera view points and corresponding images of the candidate 3D object may be determined based on accuracy requirements, computational (time) budget, computational resource availability, etc. For example, in some implementations, about 200 camera viewpoints may be utilized to capture images of the candidate 3D object such that the space around the candidate 3D object is covered by about 200 points that are distributed throughout the rendering environment.

A location of each camera viewpoint may be specified by its azimuth, a and its elevation, e. Depending on a number of images that are to be captured, camera points are selected that cover a range of azimuth and elevation values. A suitable number of images may be captured from a plurality of azimuth and elevation settings.

For example, in some implementations, the camera azimuth parameter may be selected to be between 0 and 360 degrees in steps of 18 degrees, and the camera elevation parameter selected to be between 0 and 180 degrees in steps of 18 degrees. This provides 200 distinct camera locations that provide coverage of the candidate 3D object from various orientations.

Camera Azimuth parameters ($\alpha$)=[0:360:18];

Camera Elevation parameters (e)=[0:180:18];

Camera Positions=$\alpha$X e.

where 360 in the Azimuth parameters refers to horizontal angle (e.g., images are captured from all sides of the object and 18 refers to a step-size in changes in azimuth angle (leading to 20 settings for the azimuth angle); and wherein 180 in the elevation parameters refers to vertical angle (e.g., images are captured angles including directly below and directly above the object, with multiple intermediate angles) and 18 refers to a step-size in elevation angle leading to 20 settings for elevation angle).

While example camera azimuth and elevation parameters are listed above, in some implementations, other ranges may be utilized as camera parameters. For example, in some scenarios, an objects may not be viewable from all sides (e.g., based on symmetry) and greater or fewer than 20 views may be used in various implementations.

A virtual camera is placed at each of these positions which are defined by the orientation parameters and the candidate 3D object is placed at the center of the rendering scene. The generated images (renders) allow capture of the object geometry from all around the object.

In some implementations, textures specified for the candidate 3D object may be replaced with a uniform white plastic material (or other neutral/suitable texture for capturing object images from multiple camera positions). In some implementations, a graphics processing unit (GPU) processor may be utilized to achieve hardware-accelerated rendering.

Figure 3B:
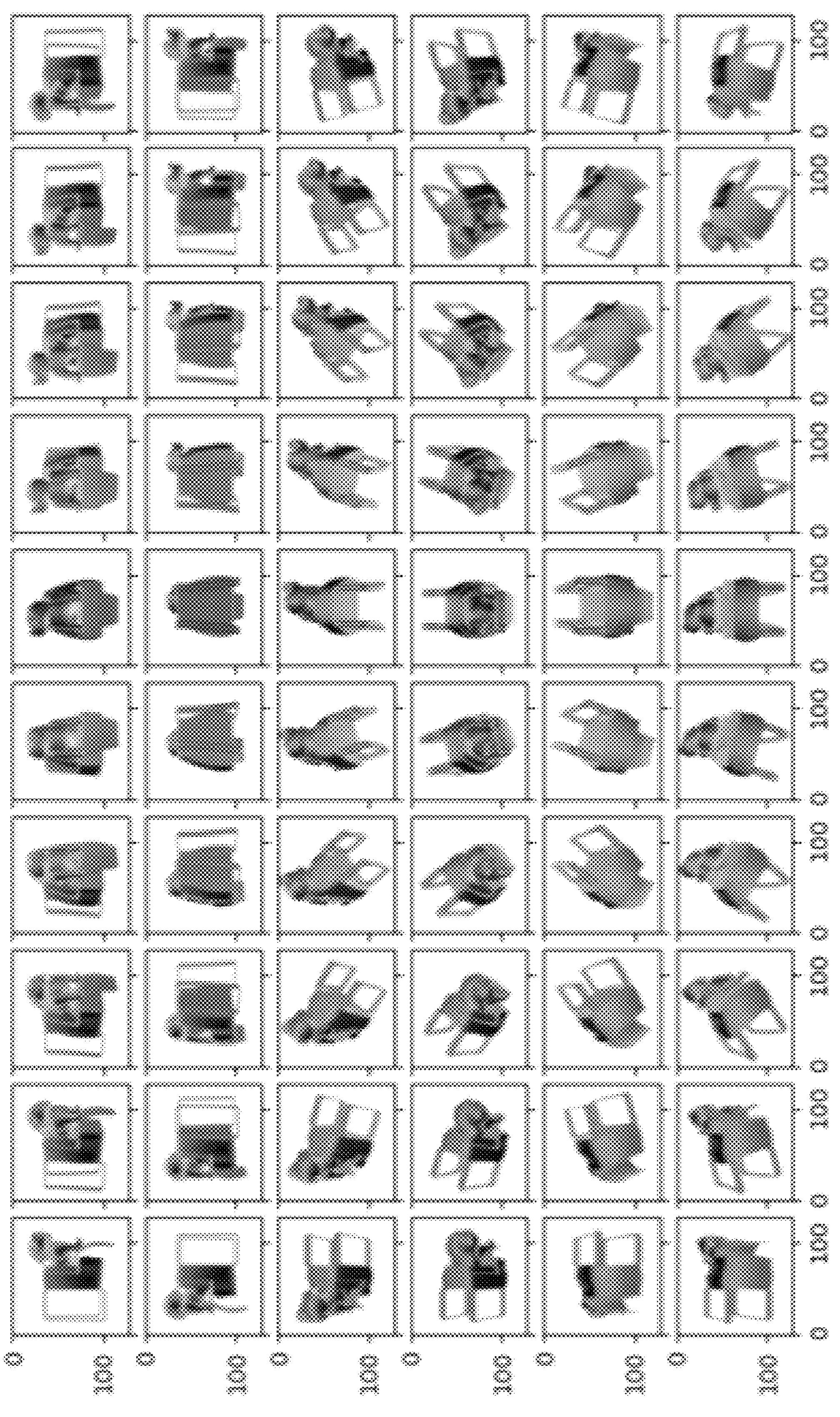
FIG. 3B is a diagram that depicts images of a 3D object that represent views from different camera positions, in accordance with some implementations.

FIG. 3B depicts example images of a 3D object that represent views from different camera positions, in accordance with some implementations.

As depicted in FIG. 3B, images of a candidate 3D object can be captured from different camera positions. Using multiple images as depicted in FIG. 3B can enable superior performance during classification and detection of inauthentic objects when compared to utilization of a single view, e.g., a thumbnail image of a candidate 3D object. In this illustrative example, the images are obtained at a 128 by 128 pixel resolution.

Figure 4:
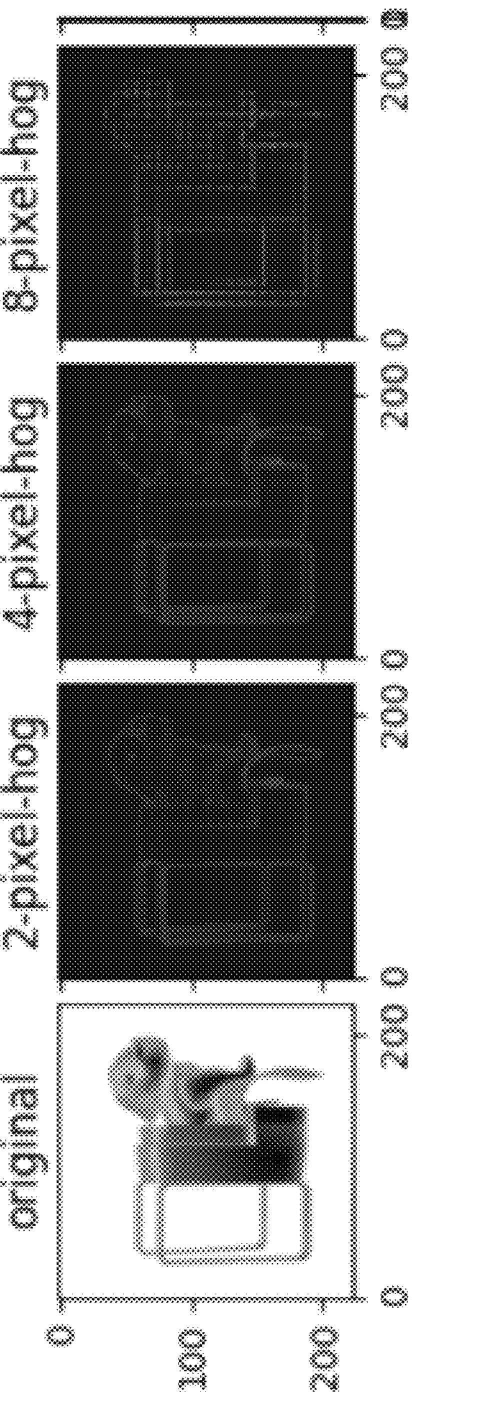
FIG. 4 is a diagram that depicts histograms of gradient (HOG) vectors of an image, in accordance with some implementations.

FIG. 4 depicts histograms of oriented gradient (HOG) vectors determined at different resolutions of an image, in accordance with some implementations.

A comparison of a candidate 3D object and authentic 3D objects may be performed by comparing respective feature vectors. In some implementations, the feature vectors may be constructed (extracted) based on histograms of oriented gradient (HOG) vectors that are determined based on images of the candidate 3D object and authentic 3D objects.

As described with reference to FIGS. 3A and 3B, two or more images of the candidate 3D objects are generated (captured) at different camera locations. For each of the generated images, a pyramidal HOG technique may be applied to generate a vector representation (feature vector) of each image.

Utilization of the histogram of oriented gradients (HOG) feature vector (descriptor) enables local 3D object appearance and shape within an image to be captured in a distribution of intensity gradients or edge directions. The captured image is divided into connected regions (cells), and for pixels included within each cell, a histogram of gradient directions is computed. In some implementations, the feature vector is the concatenation of the computed histograms. In some implementations the local histograms can be contrast-normalized by calculating a measure of the intensity across a larger region of the captured image, which is then utilized to normalize cells within the larger region. Normalization may result in better classification and detection invariance to changes in illumination and shadowing. The HOG descriptor has several advantages over other feature vector descriptors. For example, since it operates on local cells, it is invariant to geometric and photometric transformations, except for object orientation.

The process of calculating a Histogram of Oriented Gradient (HOG) vector involves dividing the images into cells of fixed pixel size. For each cell, the gradient direction and magnitude are calculated for each pixel. These gradients are quantized into a set of orientation bins and histogram magnitudes are constructed for each cell. The histograms are concatenated to form a feature vector that summarizes the geometric information in the image.

A variant of the HOG descriptor is a pyramidal HOG descriptor. The pyramidal HOG descriptor extracts the features at different resolutions and can capture finer details in an image. The determination of a pyramidal HOG feature vector for each captured image of a candidate 3D object is described herein.

The feature representation for the rendered image may then be represented as:

$$f_{\alpha,e} = \left[HOG_{\langle 2,2\rangle}(\text{image\_render}_{\alpha,e}),\ HOG_{\langle 4,4\rangle}(\text{image\_render}_{\alpha,e}),\ HOG_{\langle 16,16\rangle}(\text{image\_render}_{\alpha,e})\right];$$

where $\text{image\_render}_{\alpha,e}$ is an image generated from a camera position (location) at an azimuth of a and elevation e, and a corresponding HOG at a specific resolution of the image, n, is implemented as a function: $HOG_{<n,n>}(\ )$.

The specific resolution, n refers to the number of pixels included in a window utilized during the HOG computation.

After a pyramidal HOG vector is computed for each image rendered, the pyramidal HOG vectors for each candidate 3D object are concatenated to create an asset feature vector that represents the complete geometry of the candidate 3D object (asset).

For example, where a candidate 3D object is identified by an asset identifier, asset-id, the asset feature vector of the candidate 3D object, for which images are taken at camera positions corresponding to 20 azimuth locations and 10 elevation locations, is denoted by:

$$AssetFeatureVector_{\langle asset\text{-}id\rangle} = [f_{0,0},\ f_{0,1}\ \ldots\ f_{19,9}]$$

These extracted features, as represented by the asset feature vector (AssetFeatureVector) enable the mapping of the candidate 3D object (asset) into a multi-dimensional space where the distance between the assets in the multi-dimensional space is inversely proportional to the geometric similarity between the assets. For example, a small vector distance between two 3D objects is indicative of a high geometric similarity between the two 3D objects, and a high vector distance between two 3D objects is indicative of a low geometric similarity between the two 3D objects.

In this illustrative example, FIG. 4 depicts a series of HoG vectors of images at different resolutions. The images are depicted at size of 224 by 224 pixels, and illustrate the details captured by the Histogram of Oriented Gradients (HOG) algorithm at different resolutions. The first HoG vector image in the set depicts the HoG vector at a small window size and can capture details at a greater resolution; as the window size is increased (depicted in the set from left to right), it can be observed that the features get more 'generalized' or 'aggregated.' Finer level details as well as higher level details of a 3D object geometry can be captured by applying the HOG algorithm.

Figure 5:
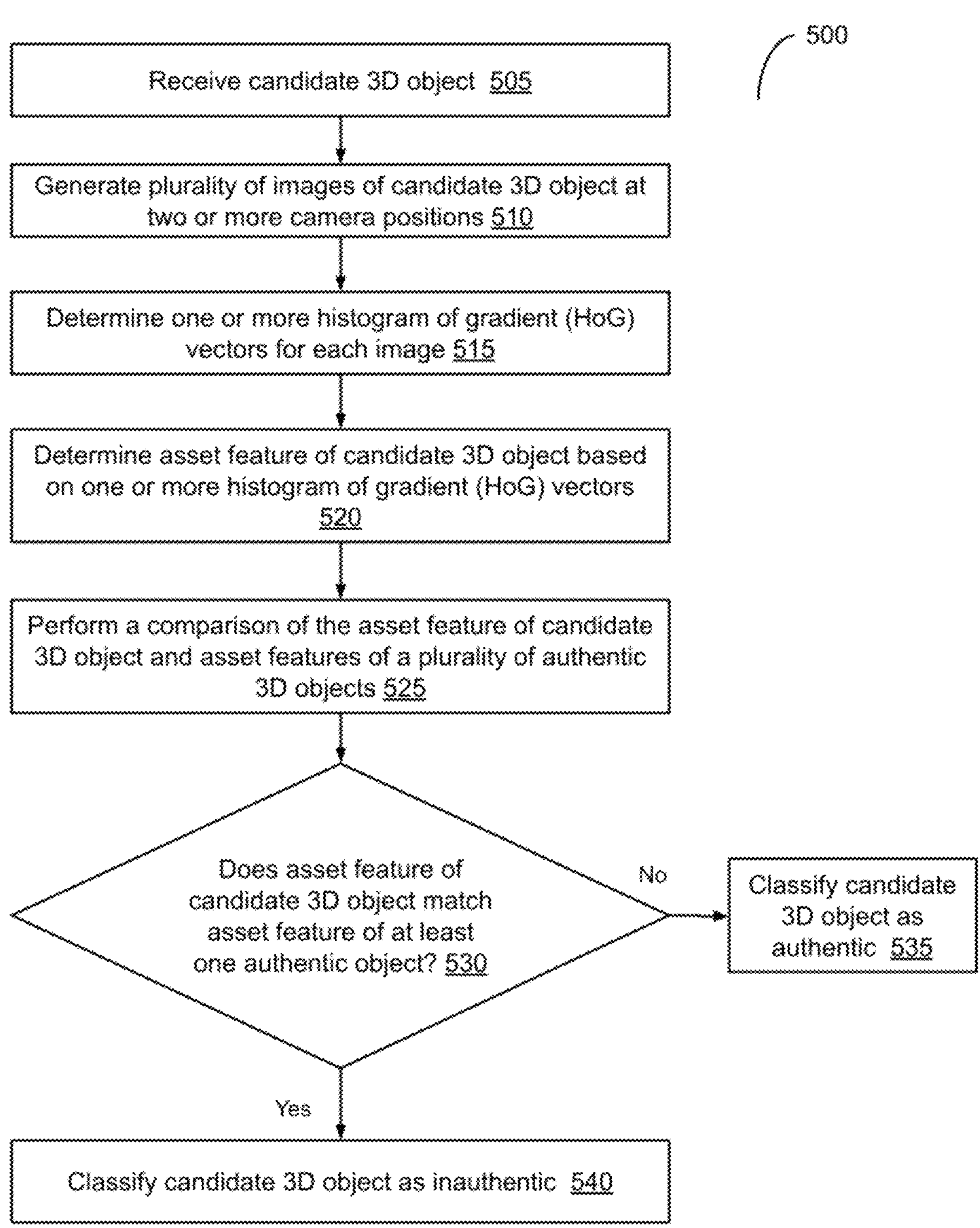
FIG. 5 is a flowchart that illustrates an example method to classify a candidate 3D object, in accordance with some implementations.

FIG. 5 is a flowchart illustrating an example method to classify a candidate 3D object, in accordance with some implementations.

In some implementations, method 500 can be implemented to classify a candidate 3D object, for example, on virtual experience server 102 described with reference to FIG. 1. In some other implementations, method 500 can be implemented, for example, on one or more servers described with reference to FIG. 1. In described examples, the implementing system includes one or more digital processors or processing circuitry ("processors"), and one or more storage devices (e.g., a data store 120 or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

Method 500 may begin at block 505.

At block 505, a candidate 3D object is received. The candidate 3D object may be received, for example, from a developer device such as developer device 130 described with reference to FIG. 1. In some implementations, the candidate 3D object may be a candidate 3D object previously received at a computing device associated with the virtual experience platform, and/or stored on a storage device associated with the virtual experience platform.

In some implementations, the candidate 3D object may be received as part of a classification process and/or workflow. In some implementations, a uniform record locator (URL), token, or other asset identifier may be utilized to provide a link to the candidate 3D object, and a processor may utilize a provided link, token, URL, etc., to obtain the candidate 3D object. The candidate 3D object may be implemented as a 3D model and may include a surface representation used to draw the object (also known as a skin or mesh) and a hierarchical set of interconnected bones (also known as a skeleton or rig). The rig may be utilized to animate the character and to simulate motion and action by the object. The 3D model may be represented as a data structure, and one or more parameters of the data structure may be modified to change various properties (attributes) of the object and/or character, e.g., dimensions (height, width, diameter, girth, etc.); body type and/or shape; movement style; number/type of parts; proportion of portions of the object or body (e.g., shoulder and hip ratio); head size; etc.

In some implementations, receiving the candidate 3D object may include obtaining a 3D mesh of the candidate 3D object.

Block 505 may be followed by block 510.

At block 510, a plurality of images (rendered images or rendered views) of a candidate 3D object are generated, wherein each of the plurality of images is captured from a respective camera position of two or more camera positions. In some implementations, generating the plurality of images of the candidate 3D object may include generating the plurality of images at multiple different azimuth and/or elevation settings.

In some implementations, two or more images of a candidate 3D object are generated, wherein each image of the two or more images of the candidate 3D object is captured from a respective camera position of two or more camera positions.

In some implementations, the plurality of images of the candidate 3D object may include about 200 images captured from 200 different camera positions, wherein each camera position corresponds to a particular azimuth and elevation setting of a plurality of azimuth settings and elevation settings. For example, in some implementations, the camera positions may correspond to about 20 different azimuth locations, and about 10 elevation locations so as to provide a comprehensive set of views of the candidate 3D object. In some implementations, a modified Ritter's algorithm may be utilized to determine a size (bounding circle) of the candidate 3D object, and to adjust a field of view of the camera.

In some implementations, during generation of the image of the candidate 3D object, a camera view (field of view of the camera) may be adjusted during capture of the image such that the candidate 3D object occupies a predetermined area of the image. For example, a predetermined area may be specified as a range, e.g., between 70-75% of the area of the image.

In some implementations, during generation of the image of the candidate 3D object, a camera view may be adjusted during capture of the image such that the candidate 3D object occupies at least a (minimum) predetermined area of the image. For example, a predetermined area may be specified as a minimum, e.g., for the candidate 3D object to occupy at least 70% of the area of the image.

In some implementations, a single camera position may be utilized, and a single image of the candidate 3D object may be captured for further analysis. This may enable quick classification and verification of authenticity of a candidate 3D object and may be utilized in some scenarios where the speed of a classification result may be prioritized over accuracy.

In some implementations, prior to generating the plurality of images of the candidate 3D object, a texture of the candidate 3D object may be replaced with a white plastic material (or other neutral material). In some implementations, a material that replaces a previous texture of a candidate 3D object may be selected such that it has a predetermined reflectivity that enables the asset feature vector to provide a representation of an inside of the candidate 3D object as well as to provide standardization. Block 510 may be followed by block 515.

At block 515, one or more histogram of oriented gradients (HOG) vectors for each image of the plurality of images of the candidate 3D object are determined. In some implementations, determining the one or more HOG vectors may include determining one or more pyramidal HOG vectors, and wherein each of the one or more pyramidal HOG vectors is generated by concatenating HOG vectors of the candidate 3D object generated at multiple resolutions of a respective image of the candidate 3D object.

In some implementations, a pyramidal HOG vector is determined that includes a concatenation of HOG vectors that are computed based on different resolutions of each image. The pyramidal HOG may be a vector that comprises HOGs at multiple resolutions concatenated together.

In some implementations, the resolution of the HOG vector may refer to a window size that specifies a number of pixels per window. For example, the HOG vector may be computed at resolutions of 2, 4, and 16, whereby the windows utilized to compute the HOG vectors may include 2, 4, and 18 pixels per window, respectively. A 2-pixel HOG represents a HOG vector that is computed at a relatively high resolution of the image, and a 16-pixel HOG vector represents a HOG vector that is computed at a lower resolution of the image (when compared to a 2-pixel HOG). Block 515 may be followed by block 520.

At block 520, an asset feature (e.g., asset feature vector) of the candidate 3D object is determined based on the one or more HOG vectors for each of the plurality of images of the candidate 3D object. In some implementations, the asset feature vector is determined by concatenating the HOG vectors obtained from each image to generate a representation of the candidate 3D object that includes embeddings from all camera views of the candidate 3D object. Block 520 may be followed by block 525.

At block 525, the asset feature of the candidate 3D object is compared to asset features of authentic 3D objects. In some implementations, it may not be feasible for a comparison of asset feature vectors to be performed at their full calculated dimension and still meet performance considerations (e.g., real time or near real time detection of counterfeit objects). In such implementations, dimensionality reduction of the asset feature vector(s) may be performed.

For example, a full geometric asset feature vector generated from a pyramidal HOG based feature extraction described above with about 200 images, and at 3 hierarchical resolutions (of the pyramidal HOG) has a dimension of about 2 M float values (floating point numbers). For a database that includes about 100,000 3D objects, memory of 700 GB may be needed. In some scenarios, this may present computational challenges.

In some implementations, techniques such as incremental principal component analysis (PCA), Principal Coordinate Analysis (PCoA), etc., may be utilized to reduce the dimensions of the asset feature vector(s) of candidate 3D objects and authentic 3D objects. The reduced dimension asset feature vector, e.g., at a reduced dimension of 1024 by 1 may be determined by applying a suitable PCA Transformer to the full geometric asset feature vector:

$$AssetFeatureVector[1024D]_{<assetid>} = AssetFeatureVector_{<assetid>} X\ PCA\ \text{Transformer}$$

In some implementations, prior to a comparison of a candidate 3D object and an authentic 3D object, a principal component analysis operation and/or a principal coordinate analysis (PCoA) operation is performed on the asset feature vector to reduce a dimension of the asset feature vector. Determining if the asset feature of the candidate 3D object matches the authentic asset feature of at least one authentic 3D object may include performing a comparison of a reduced dimension asset feature vector of the candidate 3D object against a reduced dimension asset feature vector of at least one authentic 3D object.

In some implementations, prior to performing the comparison of an asset feature of a candidate 3D object with asset features of authentic 3D objects, it may be determined (verified) that a user identifier associated with the candidate 3D object does not match a user identifier associated with an authentic object. This may be performed to ensure that a candidate 3D model from a user that had previously submitted the same 3D object previously is not flagged as inauthentic. In some implementations, determining (verifying) that a user identifier associated with the candidate 3D object does not match a user identifier associated with an authentic object may be performed subsequent to a comparison of an asset feature of a candidate 3D object with asset features of authentic 3D objects, and prior to classifying or flagging the candidate 3D object as inauthentic. Block 525 may be followed by block 530.

At block 530, it is determined if the asset feature of the candidate 3D object matches an authentic asset feature of at least one authentic 3D object. In some implementations, determining if the asset feature of the candidate 3D object matches an authentic asset feature of at least one authentic 3D object may include calculating a vector distance between the asset feature of the candidate 3D object and at least one authentic 3D object, and wherein it is determined that the asset feature of the candidate 3D object matches the authentic asset feature of the at least one authentic 3D object if the vector distance meets a predetermined threshold.

For example, in some implementations, a Euclidean distance may be calculated between an asset feature vector of the candidate 3D object and one or more authentic 3D objects to determine a geometric similarity between the candidate 3D object and the one or more authentic 3D objects. In some other implementations, other distance measures, e.g., Manhattan distance, Hamming distance, Cosine distance, etc., may be utilized to determine a similarity of asset feature vectors.

In some implementations, a search index may be utilized to perform an approximate neighbors search based on the asset feature vectors of the candidate 3D object and one or more authentic 3D objects.

In some implementations, determining if the asset feature of the candidate 3D object matches an authentic asset feature of at least one authentic 3D object may include generating a hash of the asset feature of the candidate 3D object, and detecting a collision between the asset feature of the candidate 3D object and the asset features of the plurality of authentic objects within a unit hypercube.

In some implementations, an edge magnitude of a unit hypercube may be dynamically adjusted based on an area of interest, wherein smaller edge magnitudes may be selected for regions of greater interest for classification. For example, portions of a candidate 3D object that correspond to regions of greater interest, e.g., visually prominent portions, etc., may be compared by utilizing hypercube with smaller edge magnitudes.

In some implementations, an edge magnitude of a unit hypercube may be dynamically adjusted based on a type or class of object. For example, tuning for different classes of 3D objects may be performed by adjusting the dimension of the unit hypercubes that are utilized to determine the HOG values.

Because the hash function is essentially a custom partitioned space, additional parameters may be included into the hash function to increase the precision in certain areas of the space based on requirement or density of the clusters. The heterogeneous space partitions may be generated by using hierarchical clustering and observing the density of the generated clusters.

In some scenarios, an orientation of a candidate 3D object may not match an orientation of one or more stored authentic 3D objects. This may lead to inauthentic objects being flagged as authentic based on a comparison of the candidate 3D object in its default (or received) orientation, whereas a comparison based on a different orientation of the candidate 3D object can lead to a determination that the candidate 3D object matches one or more authentic 3D objects.

In some implementations, determining if the asset feature of the candidate 3D object matches an authentic asset feature of at least one authentic 3D object comprises performing a rotationally invariant comparison of the asset feature of the candidate 3D object and the asset feature of the at least one authentic 3D object.

For example, even though the $\text{AssetFeature}_{<assetid>}$ represents the entire geometry of the 3D object, a change in the object's initial orientation can therefore change the feature vector corresponding to the object. Since the asset feature vector is a concatenation of the individual image HoG feature vectors in the order of the camera viewpoints, the original asset feature vector can be suitably transformed to generate asset feature vectors that correspond to other orientations of the candidate 3D object.

In some implementations, performing the rotationally invariant comparison of the asset feature of the candidate 3D object and asset feature of the at least one authentic 3D object may include generating a plurality of rolled asset feature vectors of the candidate 3D object based on the asset feature of the candidate 3D object, wherein each rolled asset feature vector corresponds to a particular orientation of the candidate 3D object. After the rolled asset feature vectors are generated, each of the plurality of rolled asset feature vectors is compared with the asset feature of at least one authentic 3D object.

In some implementations, the rolled asset feature vectors may be aligned to the orientations of camera views that were utilized to generate the asset feature vectors (e.g., images utilized to generate the pyramidal HOG vectors of the candidate 3D object).

While an infinite set of orientations is theoretically possible, suitable approximations of the asset feature vector at multiple orientations may be generated by selecting combinations of the camera viewpoints for the multiple orientations.

For example, if $<O_\alpha, O_e>$ is an orientation from which we an asset feature vector is to be generated, the asset feature vector may be determined by the operation:

$$AssetFeatureVector[O_\alpha, O_e]_{<assetid>} = [f_{0-O\alpha,0-Oe}, f_{0-O\alpha,1-Oe} \ \ldots ]$$

The rotationally invariant set includes 200 feature vectors each of which are queried against a search index to determine the nearest neighbors. In some implementations, a smaller number of alternate orientations may be utilized to limit the computational load. For example, about 20 rotations of an original asset feature vector may be determined and utilized for the comparison.

In some implementations, the rolled asset feature vectors may be associated with orientations that are not aligned to the camera views that were utilized to generate the asset feature vector.

In some implementations, a rotational invariant k-nearest neighbors (KNN) search is performed. In some other implementations, rotational invariance is performed by suitable modification of the asset feature vector embedding by applying spherical harmonics techniques during the generation of the asset feature vector. In some implementations, performing the rotationally invariant comparison of the asset feature of the candidate 3D object and asset features of the plurality of authentic 3D objects may include applying spherical harmonic functions to represent the asset feature vector such that the asset feature vector is specified as a set of functions on the surface of a sphere.

If it is determined that the asset feature of the candidate 3D object matches the authentic asset feature of at least one authentic 3D object, block 530 may be followed by block 540, else block 530 may be followed by block 535.

At block 535, the candidate 3D object is classified as an authentic object. In some implementations, classifying the candidate 3D object as an authentic object may include assigning a flag to the candidate 3D object, and wherein the flag is readable by a virtual experience platform engine/game engine and causes the virtual experience platform engine/game engine to enable use of the candidate 3D object in a virtual environment hosted by the virtual experience platform engine/game engine. For example, an image of the candidate 3D object determined to be authentic may be displayed on a screen of a user device that is participating in a virtual experience within a virtual environment.

In some implementations, subsequent to classifying the candidate 3D object as an authentic object, the candidate 3D object may be stored at a different location, e.g., different storage location, on the platform that is utilized to store authenticated 3D objects.

In some implementations, the asset feature vector computed of the candidate 3D object may be stored at a data store associated with a platform. In some implementations, a whole asset feature vector may be stored. In some implementations, after classifying the candidate 3D object as an authentic 3D object, the candidate 3D object, or its asset feature may be stored in a storage device and/or a memory (for example, on data store 120), and utilized to authenticate other candidate 3D objects that may be received subsequently. The stored authentic 3D object may be made available for use in a virtual environment. A user interface may be provided that includes the authentic 3D object in a virtual environment. Further, if the virtual environment enables users to buy genuine objects (e.g., by the payment of a virtual and/or real currency) or obtain access to genuine objects via a subscription, the authentic 3D object (which is the candidate 3D virtual object after classification at block 535) may be made available to users.

At block 540, the candidate 3D object is classified as an inauthentic object. For example, if the vector distance between an asset feature vector of an unauthenticated virtual candidate 3D object and asset feature vectors of authentic 3D objects meets a predetermined threshold (e.g., the distance is less than a predetermined threshold), it is classified as a counterfeit 3D object.

In some implementations, classifying the candidate 3D object as an inauthentic object may further include assigning a flag to the candidate 3D object, wherein the flag is readable by a virtual experience engine/game engine and may cause the virtual experience engine/game engine to prevent use of the candidate 3D object in a virtual environment hosted by the virtual experience engine/game engine.

Upon detection (classification of a 3D object as inauthentic) of an inauthentic 3D object, the platform may provide a notification to the developer user that the provided 3D object is inauthentic. For example, a notification may be provided via the user interface to alert the user that some or all portions of content, e.g., a candidate 3D object, provided by the user cannot be utilized.

In some implementations, suitable alternatives to the impermissible content may automatically be suggested, e.g., via a notification in the user interface to the user, so as to enable the developer user to select a suitable replacement to the impermissible content.

In some implementations, the developer user may be provided with an option to submit an alternate candidate 3D object. Upon receiving an alternate candidate 3D object, the virtual experience platform may classify the newly received candidate 3D object and upon verification of the authenticity of the newly received candidate 3D object, replace the inauthentic candidate 3D object with the newly received candidate 3D object.

Blocks 505-540 may be performed (or repeated) in a different order than described above and/or one or more steps can be omitted. For example, block 510 may be performed multiple times, e.g., to generate images of multiple candidate 3D objects, prior to generating their asset feature and performing a comparison with authentic 3D objects.

In some implementations, received candidate 3D objects on the virtual experience platform may be scanned at a predetermined frequency (e.g., every day, every other day, every hour, etc.) to detect any inauthentic objects to mitigate user access to such objects. In some implementations, candidate 3D objects that are more likely to be copied may be scanned at a higher frequency than 3D objects that are less likely to be copied. In some implementations, method 500 may be performed each time a new 3D object is received via a user upload. In some implementations, method 500 may be performed when a stored object is modified.

In some implementations, user feedback regarding inauthentic objects they encounter on the platform may be utilized to update the threshold distance and method 500 may be performed for one or more previously authenticated 3D objects.

In some implementations, one or more parameters, e.g., a number of camera views, a threshold distance, a number of levels of the pyramidal HOG, a number of orientations of an asset feature vector to use during comparison (inference) etc., may be updated (adjusted) based on previous detection results of 3D objects.

In some implementations, the classification as an authentic 3D object may be used as a signal and combined with other signals (for example, manual review of 3D objects, developer rating associated with the developer uploading the 3D object, etc.) in order to further classify the 3D object.

In some implementations, after classifying the candidate 3D object as an authentic and/or genuine object, the asset features of the candidate 3D object may be stored (for example, on data store 120), and utilized to authenticate other 3D objects that may be received subsequently.

Figure 6A:
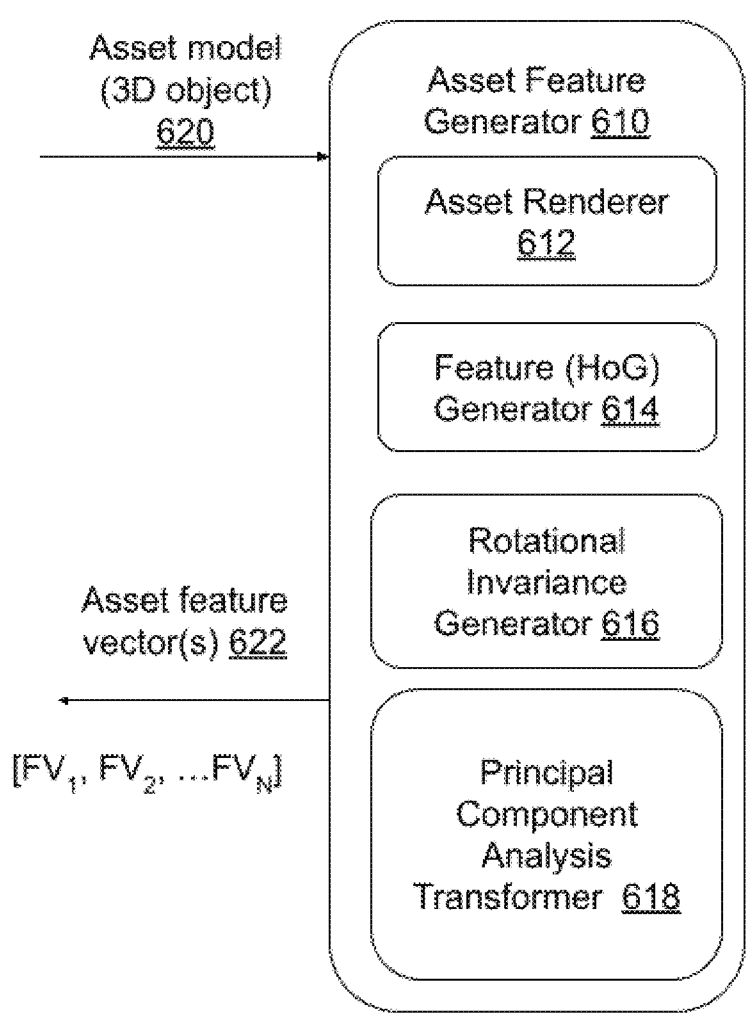
FIG. 6A is a schematic that depicts an asset feature generator, in accordance with some implementations.

FIG. 6A is a schematic that depicts an asset feature generator, in accordance with some implementations.

As depicted in FIG. 6A, an asset feature generator 610 includes an asset renderer 612, a feature generator 614, a rotationally invariant generator 616, and a principal component analysis (PCA) transformer (618).

The asset feature generator 610 receives (or obtains) an asset model 620, e.g., a 3D model of a candidate 3D object. The asset renderer 612 is utilized to generate one or more images corresponding to different camera positions. The feature generator 614 is utilized to generate a feature vector, e.g., HOG vectors, corresponding to each of the one or more images. The rotational invariance generator 616 is utilized to determine multiple asset feature vectors, each of which corresponds to a different orientation of the candidate 3D object. The PCA transformer or other dimensionality reduction transformer 618 is utilized to reduce the dimension of the asset feature vectors.

Asset feature vectors 622 corresponding to the different orientations (e.g., $FV_1$ through $FV_N$) are provided as output by the asset feature generator.

Figure 6B:
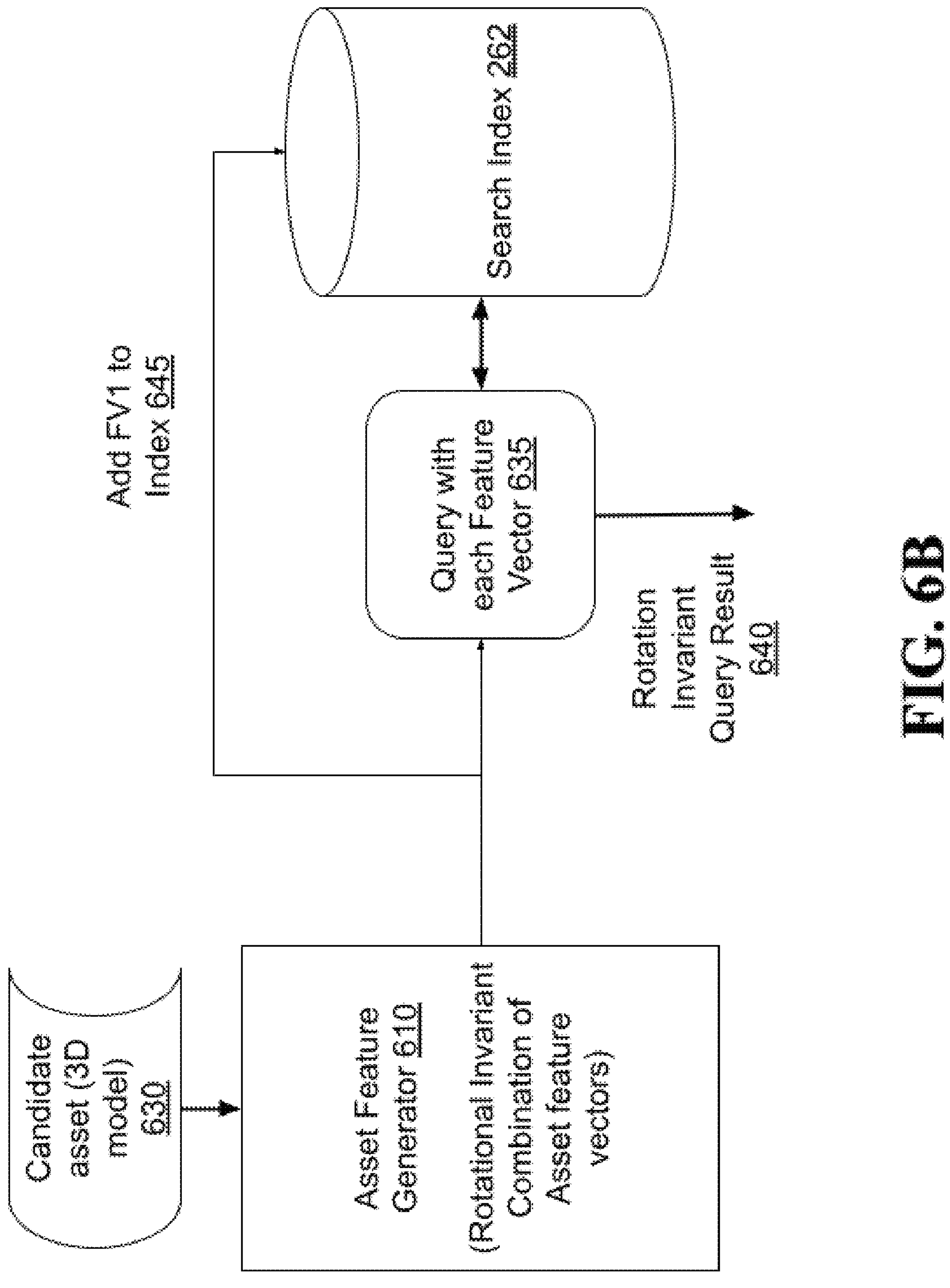
FIG. 6B is a schematic that depicts comparison of candidate 3D objects with authentic objects, in accordance with some implementations.

FIG. 6B is a schematic that depicts comparison of candidate 3D objects with authentic objects, in accordance with some implementations.

As depicted in FIG. 6B, a candidate asset, e.g., a 3D model 630 of a candidate 3D object, is received at an asset feature generator 610, which generates a rotationally invariant combination of asset feature vectors. For example, in some implementations, about 200 feature vectors may be generated, each corresponding to different orientations of a 3D mesh of the candidate 3D object. A search index 262 is queried with each of the generated asset feature vectors to determine a rotation invariant query result 640. In some implementations, a distributed search and analytics engine may be utilized to perform the search.

Additionally, a single asset feature vector corresponding to a default orientation of the candidate 3D object is indexed and stored 645, e.g., in the search index 262, for subsequent queries.

Figure 7:
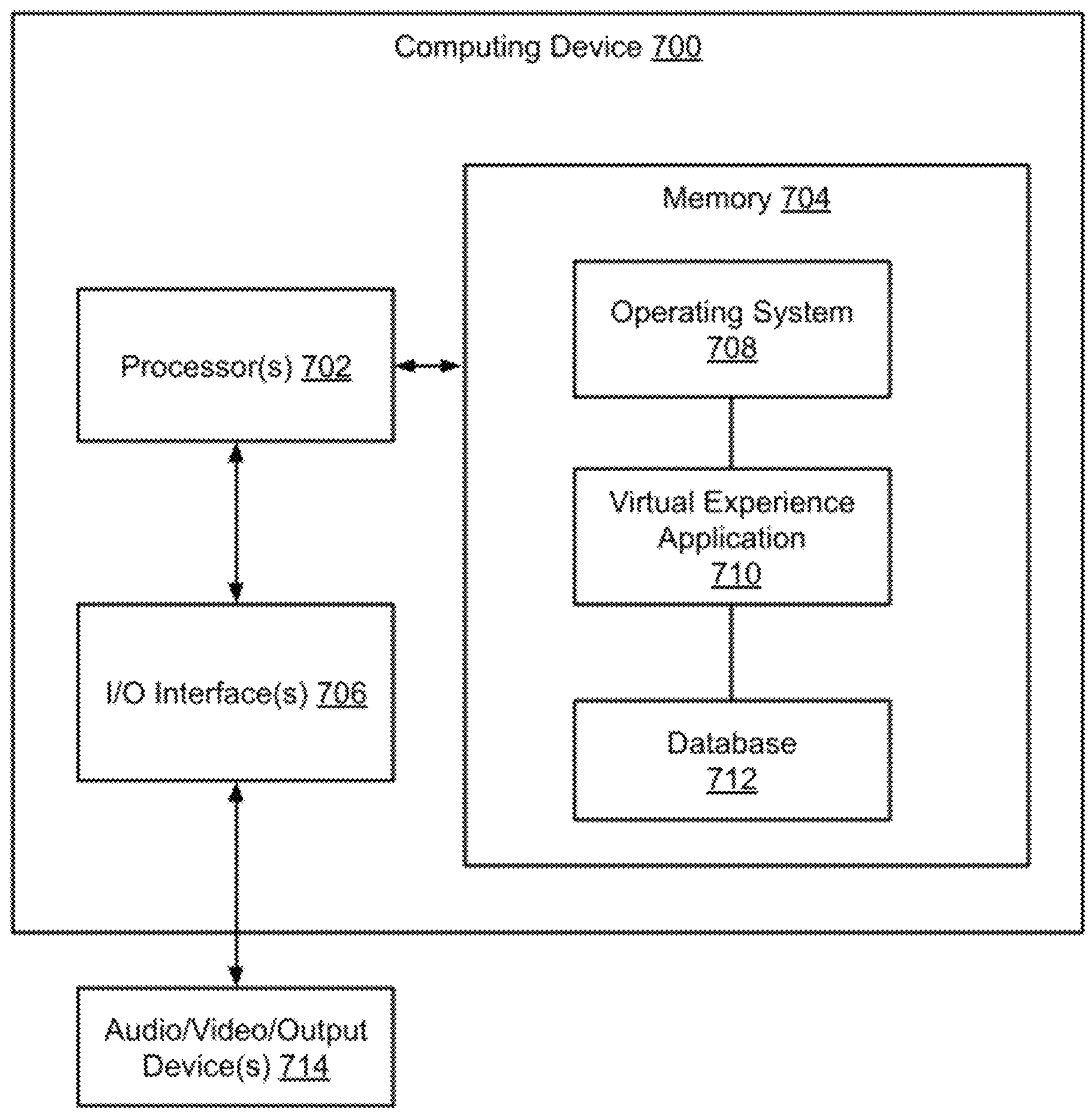
FIG. 7 is a block diagram that illustrates an example computing device, in accordance with some implementations.

FIG. 7 is a block diagram of an example computing device 700 which may be used to implement one or more features described herein. In one example, device 700 may be used to implement a computer device (e.g., 102, 110, and/or 130 of FIG. 1), and perform suitable method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 700 includes a processor 702, a memory 704, input/output (I/O) interface 706, and audio/video input/output devices 714.

Processor 702 can be one or more processors, processing devices, and/or processing circuits to execute program code and control basic operations of the device 700. A "processor" includes any suitable hardware and/or software system, mechanism or component that processes data, signals, or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 702, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, e.g., an audio spatialization application, a sound application, content management application, a gaming/virtual experience application, and application data 712. In some implementations, application 710 can include instructions that enable processor 702 to perform the functions (or control the functions of) described herein, e.g., some or all of the methods described with respect to FIGS. 5 and 6.

For example, application 710 can include an audio spatialization module which as described herein can provide audio spatialization within an online virtual experience server (e.g., 102). Any software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 108), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 7 shows one block for each of processor 702, memory 704, I/O interface 706, and software blocks 708 and 710. These blocks may represent one or more processors, processing devices, or processing circuitries, operating systems, memories, I/O interfaces, applications, and/or software engines. In other implementations, device 700 may not have all of the components shown and/or may have other elements including other types of elements instead of, or in addition to, those shown herein. While the online virtual experience server 102 is described as performing operations as described in some implementations herein, any suitable component or combination of components of online virtual experience server 102 or similar system, or any suitable processor or processors associated with such a system, may perform the operations described.

A user device can also be implemented and/or be used with features described herein. Example user devices can be computer devices including some similar components as the device 700, e.g., processor(s) 702, memory 704, and I/O interface 706. An operating system, software, and applications suitable for the user device can be provided in memory and used by the processor. The I/O interface for a user device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 500, etc.) can be implemented by computer program instructions or code, which can be executed on a computer. For example, the code can be implemented by one or more digital processors (e.g., microprocessors or other processing circuitry), and can be stored on a computer program product including a non-transitory computer-readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g., Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a user device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural, or object-oriented techniques. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:

generating a plurality of images of a candidate 3D object, wherein each image of the plurality of images of the candidate 3D object is from a respective camera position of two or more camera positions;

determining one or more histogram of oriented gradients (HOG) vectors for each image of the plurality of images of the candidate 3D object;

determining an asset feature of the candidate 3D object based on the one or more HOG vectors for each of the plurality of images of the candidate 3D object;

determining if the asset feature of the candidate 3D object matches an authentic asset feature of at least one authentic 3D object by calculating a vector distance between the asset feature of the candidate 3D object and the authentic asset feature of the at least one authentic 3D object, wherein it is determined that the asset feature of the candidate 3D object matches the authentic asset feature of the at least one authentic 3D object if the vector distance meets a threshold vector distance;

if the asset feature of the candidate 3D object matches the authentic asset feature of the at least one authentic 3D object, classifying the candidate 3D object as an inauthentic object; and if the asset feature of the candidate 3D object does not match the authentic asset feature of the at least one authentic 3D object, classifying the candidate 3D object as an authentic object.

2. The computer-implemented method of claim 1, wherein the vector distance is one or more of Euclidean distance, Manhattan distance, Hamming distance, cosine distance, or combinations thereof.

3. The computer-implemented method of claim 1, wherein determining if the asset feature of the candidate 3D object matches an authentic asset feature of at least one authentic 3D object further comprises performing a rotationally invariant comparison of the asset feature of the candidate 3D object and the authentic asset feature of the at least one authentic 3D object.

4. The computer-implemented method of claim 3, wherein performing the rotationally invariant comparison of the asset feature of the candidate 3D object and the authentic asset feature of the at least one authentic 3D object comprises:

generating a plurality of rolled asset feature vectors of the candidate 3D object based on the asset feature of the candidate 3D object, wherein each rolled asset feature vector corresponds to a particular orientation of the candidate 3D object; and comparing each of the plurality of rolled asset feature vectors with the authentic asset feature of the at least one authentic 3D object.

5. The computer-implemented method of claim 1, wherein determining the one or more HOG vectors comprises determining one or more pyramidal HOG vectors, and wherein each of the one or more pyramidal HOG vectors is generated by concatenating at least two HOG vectors of the candidate 3D object generated at multiple resolutions of a respective image of the plurality of images of the candidate 3D object.

6. The computer-implemented method of claim 1, wherein generating the plurality of images of the candidate 3D object comprises generating the plurality of images at one or more azimuth and elevation points.

7. The computer-implemented method of claim 1, wherein generating at least one image of the plurality of images of the candidate 3D object comprises adjusting a camera view during capture of the at least one image such that the candidate 3D object occupies at least a specified area of the image.

8. The computer-implemented method of claim 1, further comprising prior to generating the plurality of images of the candidate 3D object, replacing a texture of the candidate 3D object with a white plastic material.

9. The computer-implemented method of claim 1, wherein classifying the candidate 3D object as the authentic object further comprises assigning a flag to the candidate 3D object, and wherein the flag is readable by a game engine and causes the game engine to enable use of the candidate 3D object in a virtual environment hosted by the game engine.

10. The computer-implemented method of claim 1, wherein classifying the candidate 3D object as the inauthentic object further comprises assigning a flag to the candidate 3D object, and wherein the flag is readable by a game engine and causes the game engine to prevent use of the candidate 3D object in a virtual environment hosted by the game engine.

11. The computer-implemented method of claim 1, further comprising performing principal component analysis of the asset feature to reduce a dimension of the asset feature, and wherein determining if the asset feature of the candidate 3D object matches the authentic asset feature of the at least one authentic 3D object comprises performing a comparison of a reduced dimension asset feature of the candidate 3D object against a reduced dimension authentic asset feature of the at least one authentic 3D object.

12. A non-transitory computer-readable medium comprising instructions that, responsive to execution by a processing device, cause the processing device to perform operations comprising:

generating a plurality of images of a candidate 3D object, wherein each image of the plurality of images of the candidate 3D object is from a respective camera position of two or more camera positions;

determining one or more histogram of oriented gradients (HOG) vectors for each image of the plurality of images of the candidate 3D object;

determining an asset feature of the candidate 3D object based on the one or more HOG vectors for each of the plurality of images of the candidate 3D object;

determining if the asset feature of the candidate 3D object matches an authentic asset feature of at least one authentic 3D object by calculating a vector distance between the asset feature of the candidate 3D object and the authentic asset feature of the at least one authentic 3D object, wherein it is determined that the asset feature of the candidate 3D object matches the authentic asset feature of the at least one authentic 3D object if the vector distance meets a threshold vector distance;

if the asset feature of the candidate 3D object matches the authentic asset feature of the at least one authentic 3D object, classifying the candidate 3D object as an inauthentic object; and if the asset feature of the candidate 3D object does not match the authentic asset feature of the at least one authentic 3D object, classifying the candidate 3D object as an authentic object.

13. The non-transitory computer-readable medium of claim 12, wherein the vector distance is one or more of Euclidean distance, Manhattan distance, Hamming distance, cosine distance, or combinations thereof.

14. The non-transitory computer-readable medium of claim 12, wherein determining the one or more HOG vectors comprises determining one or more pyramidal HOG vectors, and wherein each of the one or more pyramidal HOG vectors is generated by concatenating at least two HOG vectors of the candidate 3D object generated at multiple resolutions of a respective image of the plurality of images of the candidate 3D object.

15. A system comprising:

a memory with instructions stored thereon; and a processing device, coupled to the memory, the processing device configured to access the memory and execute the instructions, wherein the instructions cause the processing device to perform operations including:

generating a plurality of images of a candidate 3D object, wherein each image of the plurality of images of the candidate 3D object is from a respective camera position of two or more camera positions;

determining one or more histogram of oriented gradients (HOG) vectors for each image of the plurality of images of the candidate 3D object;

determining an asset feature of the candidate 3D object based on the one or more HOG vectors for each of the plurality of images of the candidate 3D object;

determining if the asset feature of the candidate 3D object matches an authentic asset feature of at least one authentic 3D object by calculating a vector distance between the asset feature of the candidate 3D object and the authentic asset feature of the at least one authentic 3D object, wherein it is determined that the asset feature of the candidate 3D object matches the authentic asset feature of the at least one authentic 3D object if the vector distance meets a threshold vector distance;

if the asset feature of the candidate 3D object matches the authentic asset feature of the at least one authentic 3D object, classifying the candidate 3D object as an inauthentic object; and if the asset feature of the candidate 3D object does not match the authentic asset feature of the at least one authentic 3D object, classifying the candidate 3D object as an authentic object.

16. The system of claim 15, wherein the vector distance is one or more of Euclidean distance, Manhattan distance, Hamming distance, cosine distance, or combinations thereof.

17. The system of claim 15, wherein determining the one or more HOG vectors comprises determining one or more pyramidal HOG vectors, and wherein each of the one or more pyramidal HOG vectors is generated by concatenating at least two HOG vectors of the candidate 3D object generated at multiple resolutions of a respective image of the plurality of images of the candidate 3D object.

18. The system of claim 15, wherein determining if the asset feature of the candidate 3D object matches an authentic asset feature of at least one authentic 3D object further comprises performing a rotationally invariant comparison of the asset feature of the candidate 3D object and the authentic asset feature of the at least one authentic 3D object.

19. The system of claim 15, wherein the operations further comprise, prior to generating the plurality of images of the candidate 3D object, replacing a texture of the candidate 3D object with a white plastic material.

20. The system of claim 15, wherein the operations further comprise reducing a dimension of the asset feature, and wherein determining if the asset feature of the candidate 3D object matches the authentic asset feature of the at least one authentic 3D object comprises performing a comparison of a reduced dimension asset feature of the candidate 3D object against a reduced dimension authentic asset feature of the at least one authentic 3D object.

* * * * *